US008485176B2

(12) United States Patent
McLemore et al.

(10) Patent No.: US 8,485,176 B2
(45) Date of Patent: Jul. 16, 2013

(54) COOKING APPARATUS WITH ADJUSTABLE FUEL SUPPORT

(75) Inventors: Don McLemore, Forston, GA (US); Brian Urquhart, Columbus, GA (US); Jimmie Keith Newton, Phenix City, AL (US)

(73) Assignee: Masterbuilt Manufacturing, Inc., Columbus, GA (US)

( * ) Notice: Subject to any disclaimer, the term of this patent is extended or adjusted under 35 U.S.C. 154(b) by 299 days.

(21) Appl. No.: 12/706,806

(22) Filed: Feb. 17, 2010

(65) Prior Publication Data
US 2010/0206287 A1 Aug. 19, 2010

Related U.S. Application Data

(60) Provisional application No. 61/153,399, filed on Feb. 18, 2009.

(51) Int. Cl.
*A47J 37/00* (2006.01)

(52) U.S. Cl.
USPC .......... 126/154; 126/153; 126/25 A; 126/169; 126/1 R

(58) Field of Classification Search
USPC ................. 126/25 A, 153, 154, 169, 1 R, 283
See application file for complete search history.

(56) References Cited

U.S. PATENT DOCUMENTS

| | | | |
|---|---|---|---|
| 2,541,528 A | 2/1951 | McAvoy | |
| 3,121,386 A | 2/1964 | Persinger et al. | |
| 3,696,800 A * | 10/1972 | Close, Jr. | 126/25 A |
| 3,938,494 A | 2/1976 | Clark | |
| 4,166,413 A | 9/1979 | Meszaros | |
| 4,572,062 A | 2/1986 | Widdowson | |
| 5,253,634 A | 10/1993 | LeBeouf | |
| 5,809,988 A | 9/1998 | Wagner | |
| 5,878,739 A * | 3/1999 | Guidry | 126/25 R |
| 6,189,528 B1 | 2/2001 | Oliver | |
| 6,363,925 B1 | 4/2002 | Chavana, Jr. et al. | |
| 6,557,545 B2 | 5/2003 | Williams | |
| 2003/0019368 A1 | 1/2003 | Backus et al. | |
| 2005/0155498 A1 | 7/2005 | Killion | |
| 2008/0066733 A1 | 3/2008 | Wahl et al. | |

* cited by examiner

*Primary Examiner* — Alfred Basichas
(74) *Attorney, Agent, or Firm* — Smith, Gambrell & Russell LLP

(57) ABSTRACT

A cooking apparatus with a cooking container in which is received a fuel component support device. The cooking apparatus having an adjustment mechanism drivingly connected with the fuel component support device. The adjustment mechanism includes a handle section and an interconnected shaft assembly connected with the handle section, the interconnected shaft assembly including a first shaft section and a linkage assembly drivingly connected to the first shaft section and positioned between a base portion of the cooking container and the fuel component support device such that rotation of the first shaft, as by a vertical swinging of the handle section, produces an opposite direction change in vertical height in the linkage assembly and the supported fuel component support device. A handle engagement section is provided as in one that includes a plurality of height position stop engagement locations. Also, in an embodiment, the handle section is releasably engageable with the engagement locations as to releasably fix the fuel component support rack at one of a plurality of different height positions.

14 Claims, 21 Drawing Sheets

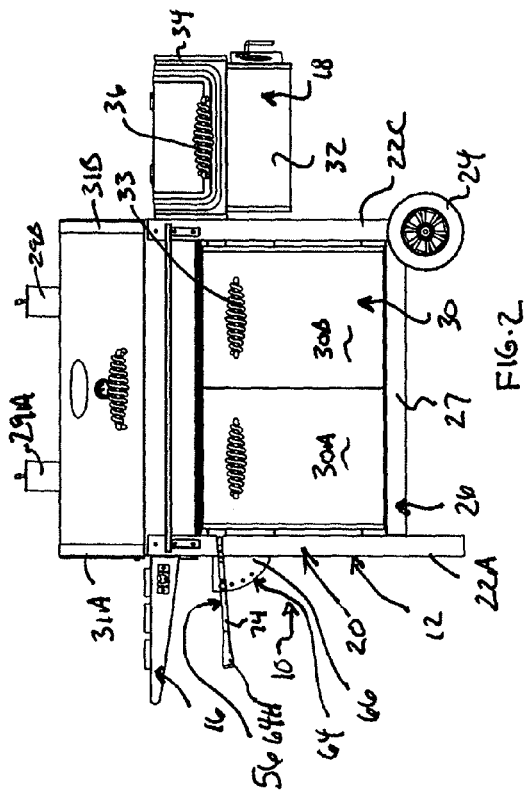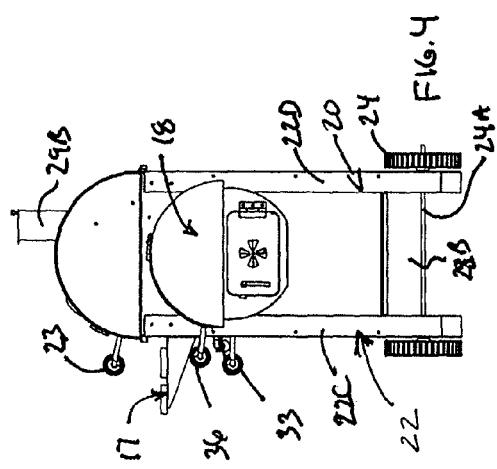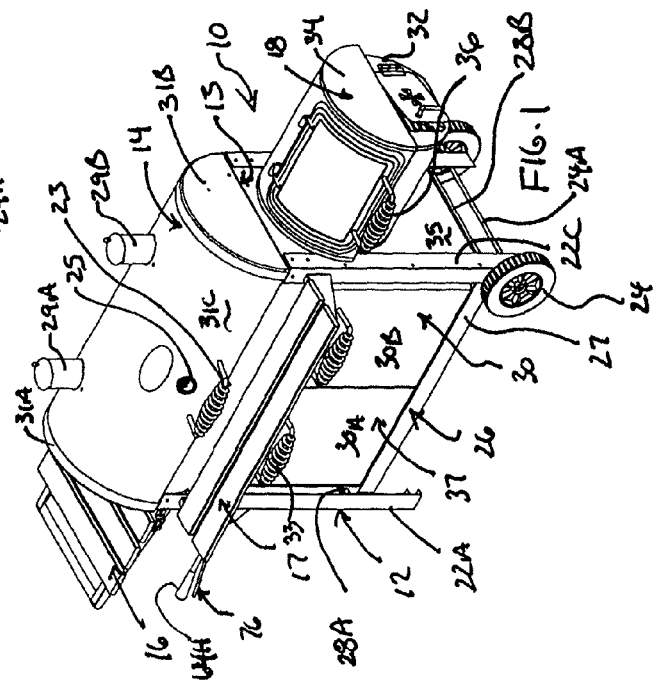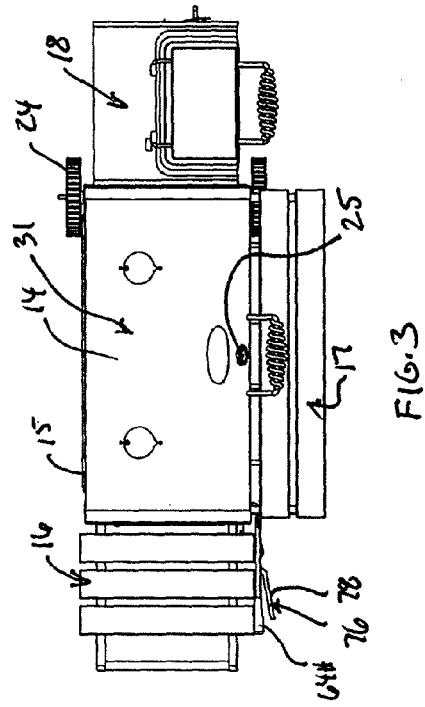

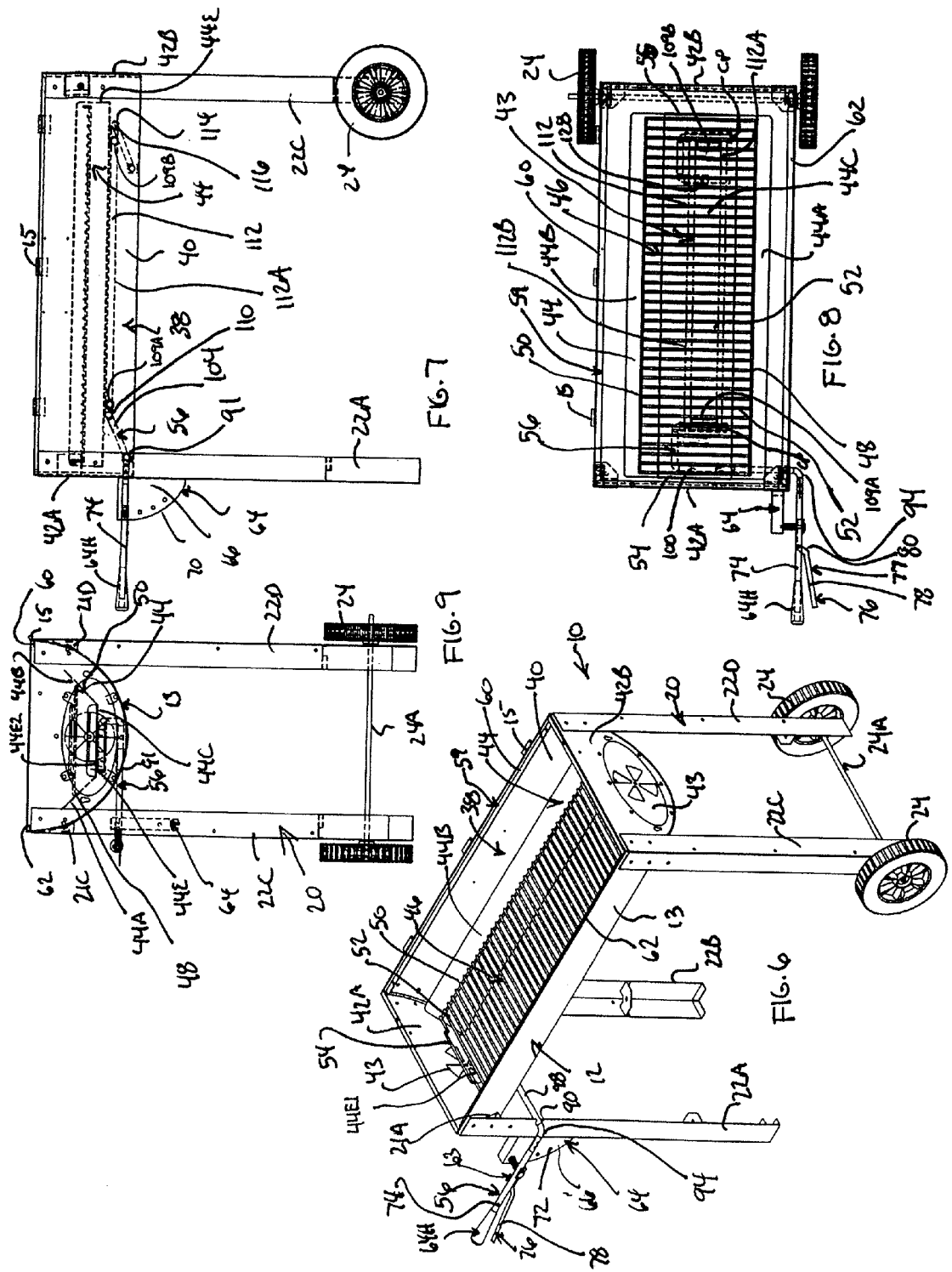

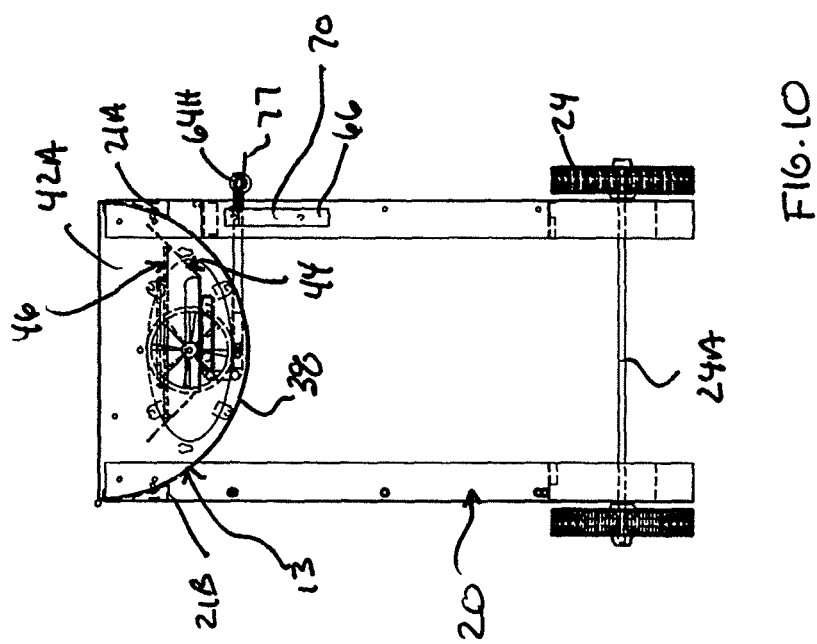

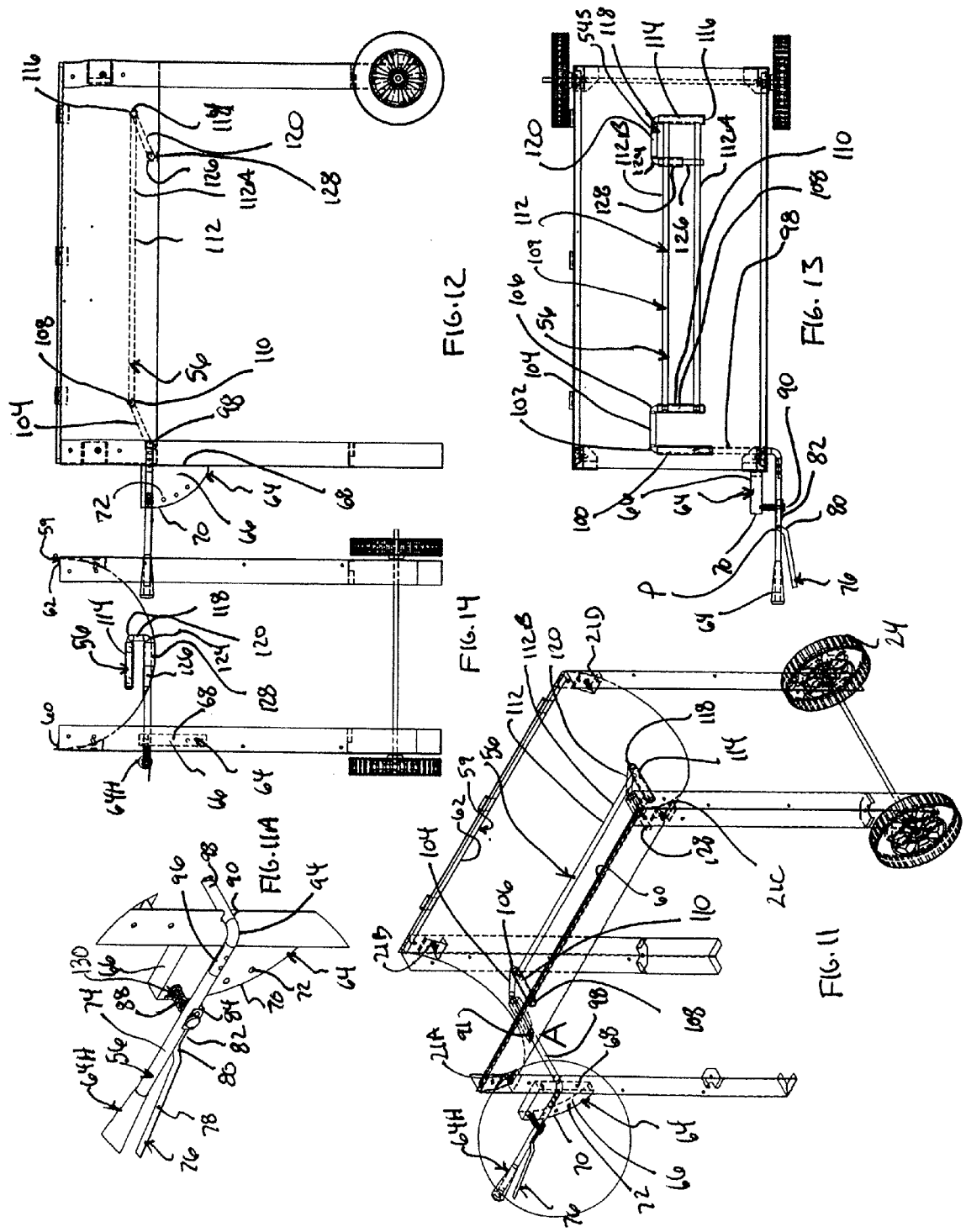

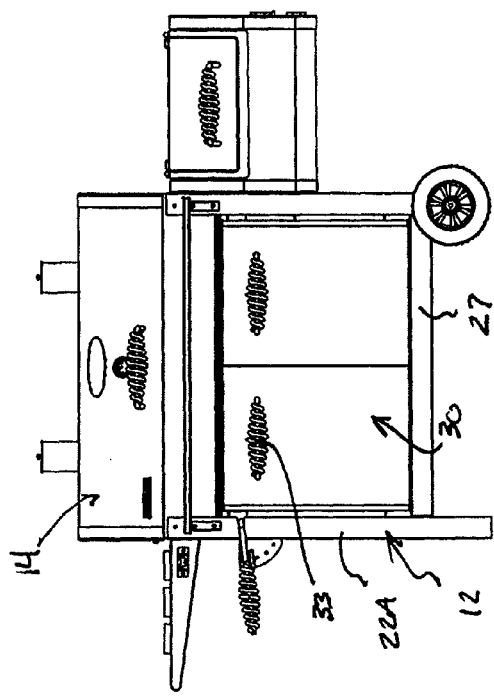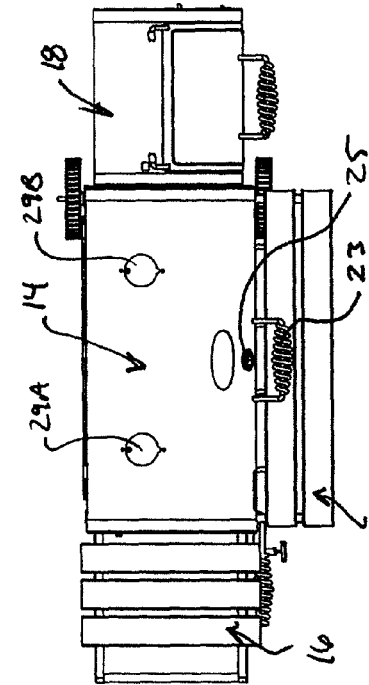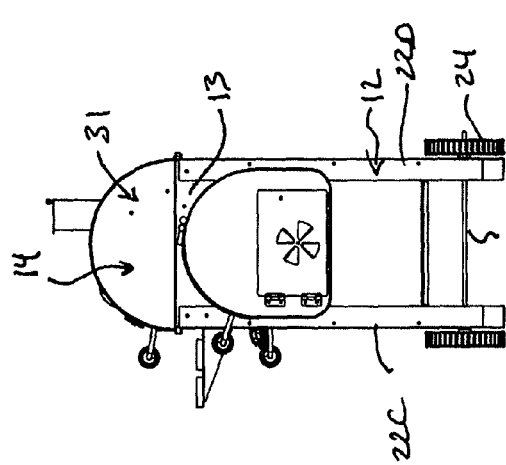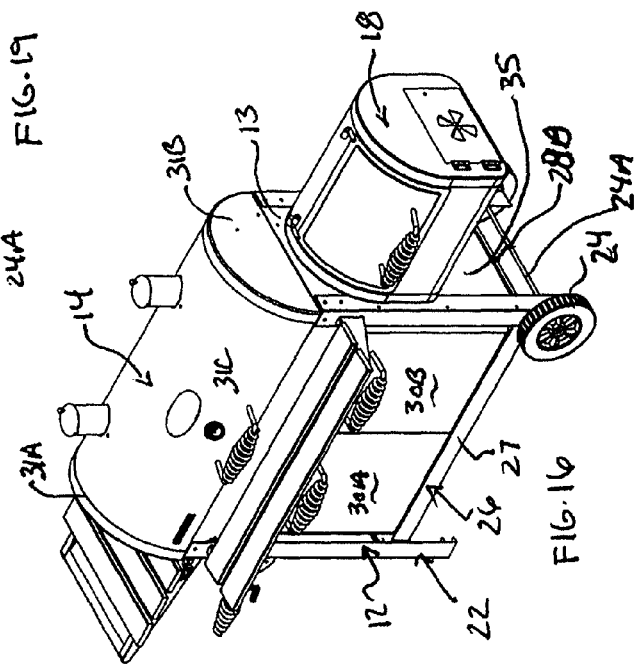

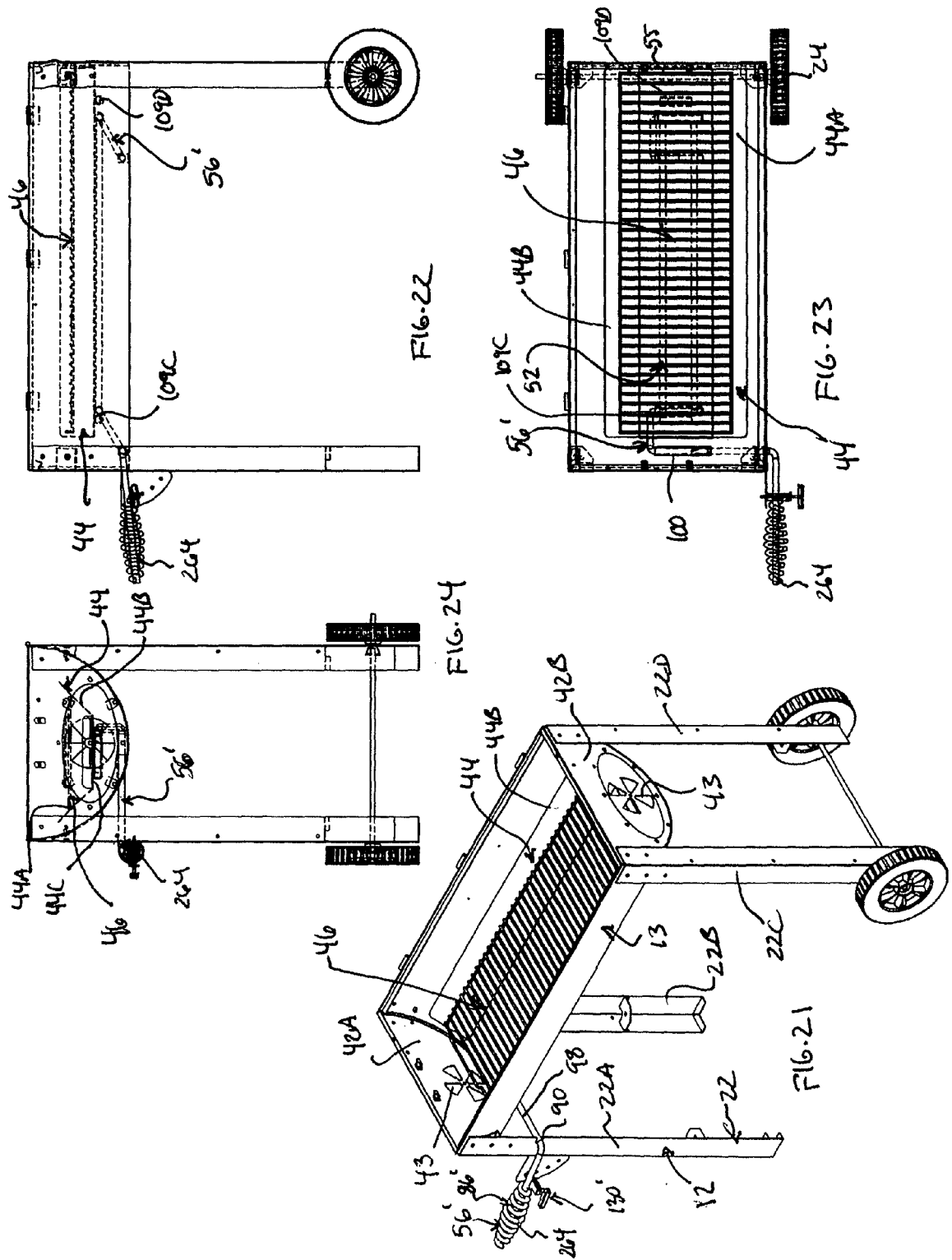

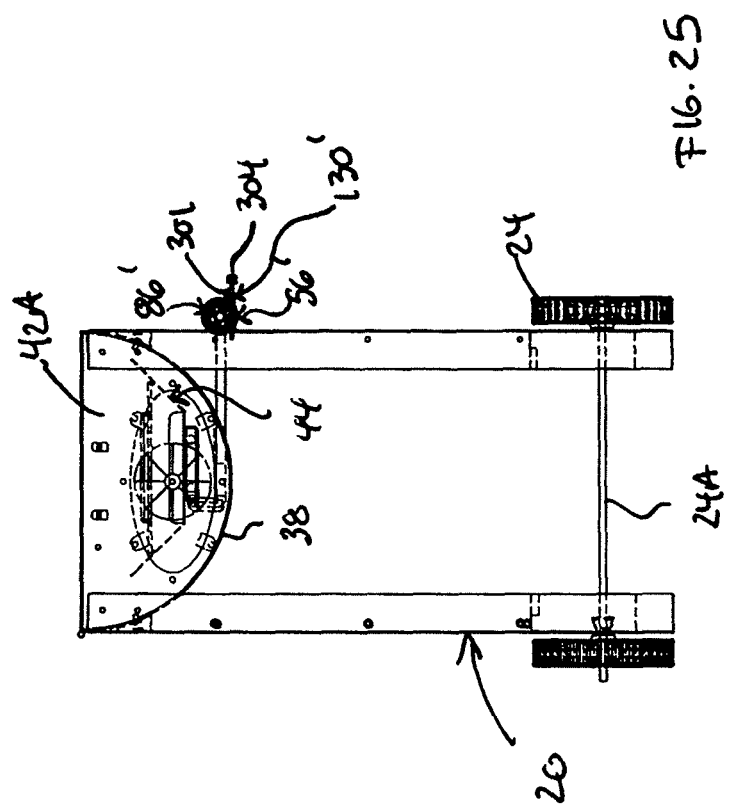

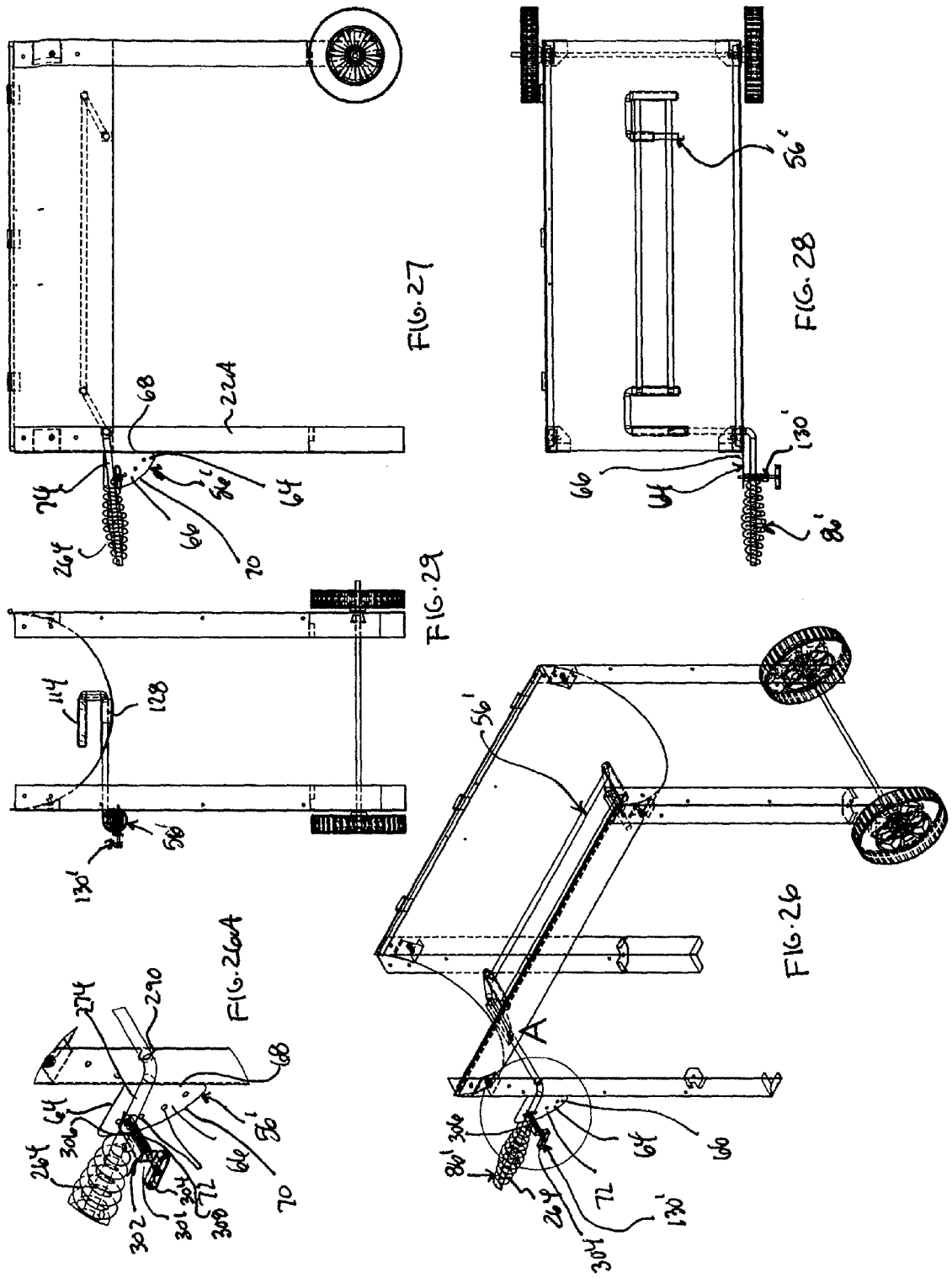

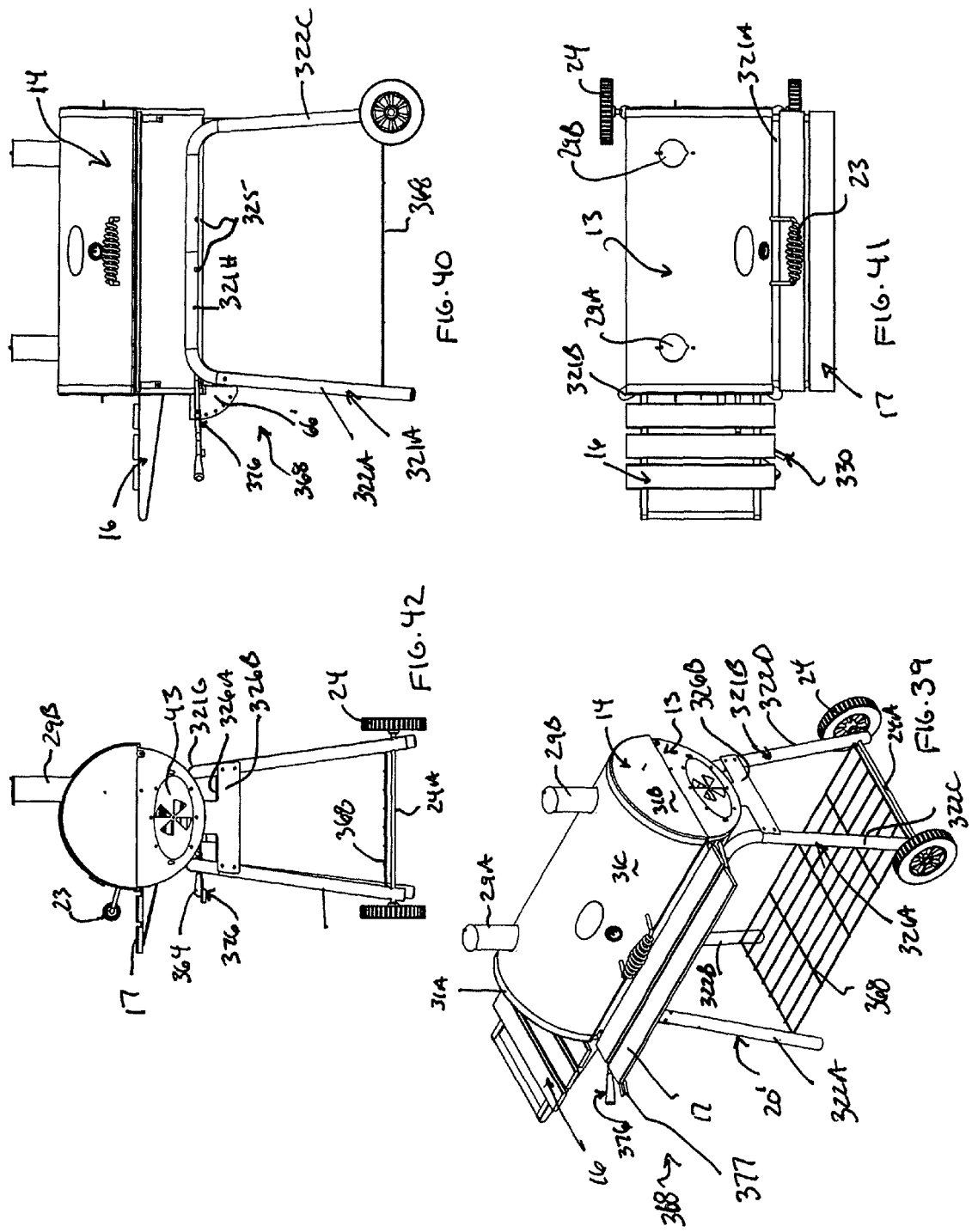

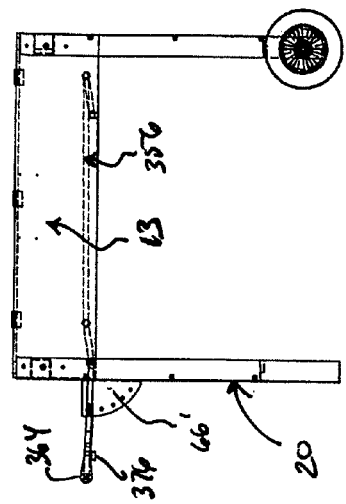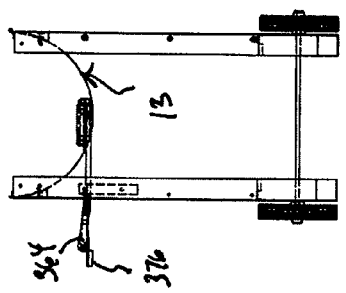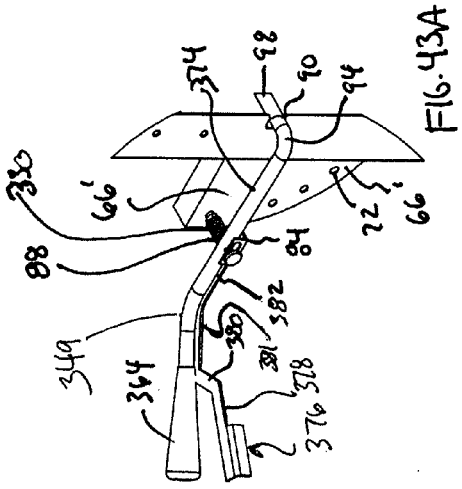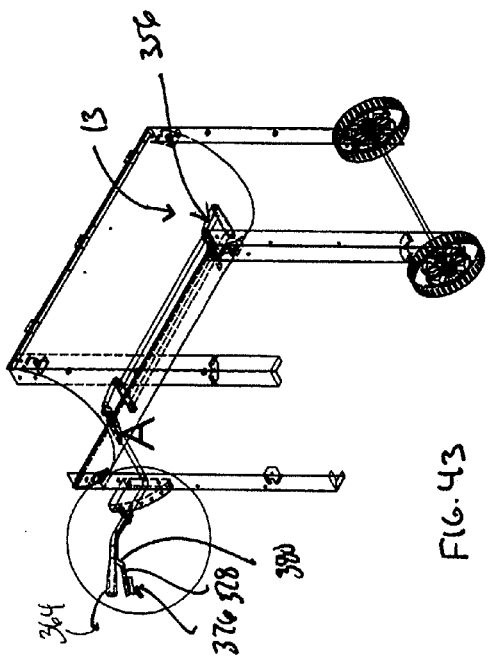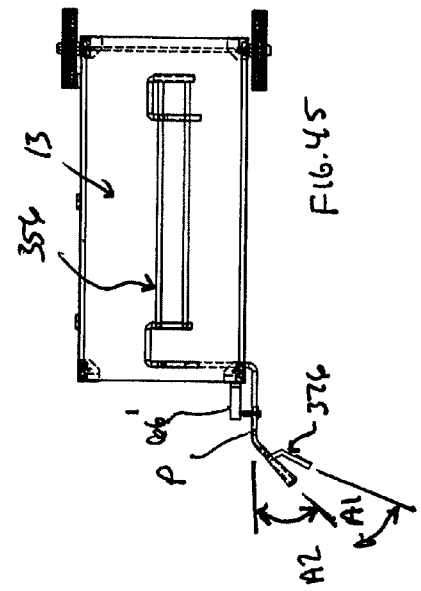

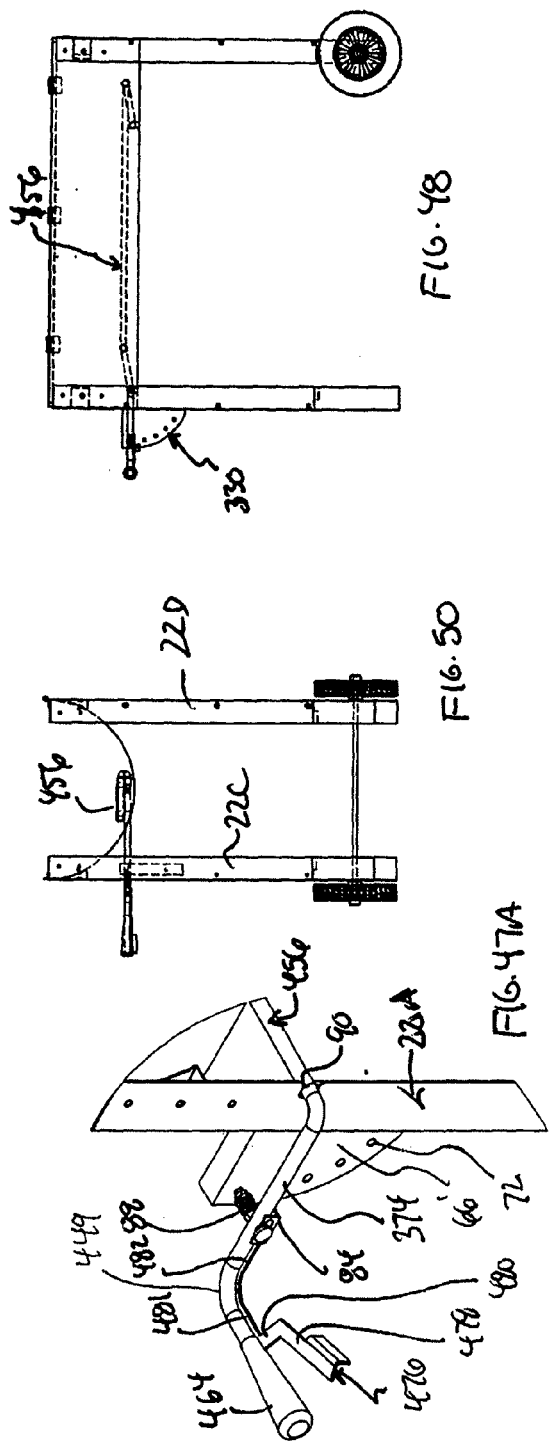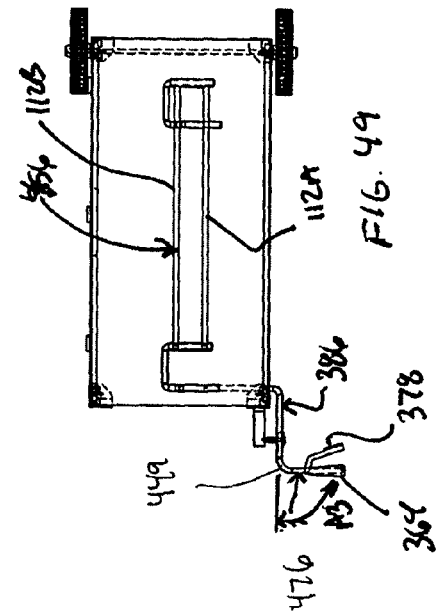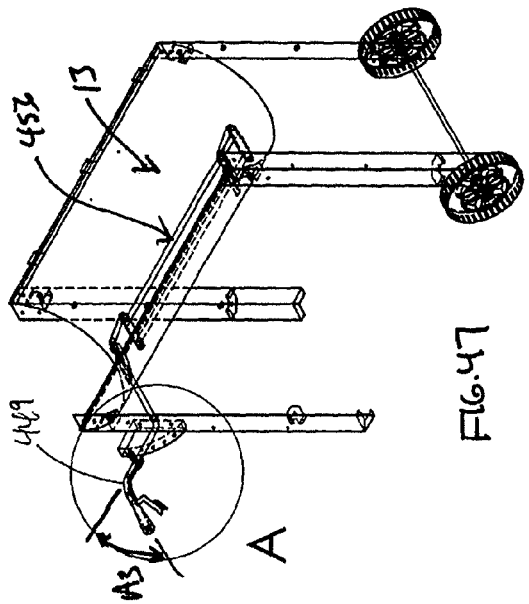

COOKING APPARATUS WITH ADJUSTABLE FUEL SUPPORT

CROSS REFERENCE TO RELATED APPLICATION(S)

The present application claims the benefit of U.S. Provisional Application No. 61/153,399 filed on Feb. 18, 2009 and which application is incorporated herein by reference in its entirety.

FIELD OF THE INVENTION

Embodiments of the present invention include a cooking apparatus as in a grill apparatus with an adjustable fuel support. An outdoor charcoal grill apparatus with an adjustment mechanism that provides an adjustable fuel supply grate or rack is illustrative of an exemplary embodiment of the invention.

BACKGROUND OF THE INVENTION

Known are charcoal grills that control cooking temperature by making the distance between the burning coals and the food being cooked adjustable. Examples of charcoal grills employing mechanisms that can be used to adjust the position of a charcoal supporting grate (or in the case of U.S. Pat. No. 4,166,413 the food grate) are seen in the U.S. Patent Nos. listed in the Table below.

| U.S. Pat. No. | First listed Inventor |
|---|---|
| 3,121,386 | PERSINGER et al. |
| 4,166,413 | MESZAROS |
| 4,572,062 | WIDDOWSON |
| 5,253,634 | LeBEOUF |
| 5,809,988 | WAGNER |
| 6,363,925 | CHAVANA, Jr. et al. |

SUMMARY OF THE INVENTION

An embodiment includes a cooking apparatus that comprises a cooking container and a fuel component support device that is receivable in the cooking container as well as an adjustment mechanism drivingly connected with the fuel component support device. The adjustment mechanism includes a handle section with a handle and an interconnected shaft assembly connected with the handle section, with the interconnected shaft assembly including a first interconnected shaft combination comprising a first shaft section, a second shaft section positioned as to extend generally in a common direction of extension as the first shaft section and an interconnecting section connecting the first and second shaft sections, and a first position retention device which is in position retention engagement with the first shaft section such that an adjustment in position of the handle generates a rotation of the first shaft section relative to the position retention device and a change in height in the second shaft section which is in height position changing engagement with the fuel component support device. The interconnected shaft assembly is arranged in this embodiment such that a height change in the handle (e.g., a free end adjustment of a grasp handle) is opposite in direction as a height change in the fuel component support device.

An embodiment also has the interconnected shaft assembly as having a first bend section extending between the handle section and the first shaft section, a second bend section extending between the first shaft section and the interconnecting section, and a third bend section extending between the interconnection section and the second shaft section, and the first, second and third bend sections being arranged such that a vertical height adjustment of the handle generates a rotation of the first shaft section relative to the first position retention device and a swinging motion in the interconnection section and a height and longitudinal adjustment in the second shaft section.

In an embodiment the cooking container both encircles and extends under the fuel support component. The container has a longitudinal extension that is of a greater longitudinal length than a longitudinal extension of the fuel component support device as to provide for longitudinal adjustment clearance between ends of the fuel component support device and respective adjacent interior surface portions of the cooking vessel as the fuel component support device changes in height and longitudinal position in correlation with the change in height and longitudinal position of the second shaft upon handle adjustment.

Also, in an embodiment the cooking apparatus is an outdoor grill device and the fuel component support device is a support rack configured for supporting a plurality of individual heating elements such as charcoal briquettes or the like. Also, in an embodiment a vertical swinging down of the handle section produces a vertical rise in said fuel component support device.

In an embodiment the interconnected shaft assembly further includes a longitudinal extension device which is in driving engagement with the first shaft and extends in a common longitudinal direction of extension as the fuel component support device. An embodiment also has the interconnected shaft assembly as further including a second interconnected shaft combination comprising a first shaft portion, a second shaft portion positioned as to extend generally in a common direction of extension as the first shaft portion and an interconnecting portion connecting the first and second shaft portions, and a second position retention device which is in position retention engagement with the second shaft portion such that an adjustment in position of a handle of the handle section generates a rotation of the first shaft section relative to the first position retention device and a change in height and longitudinal position in the second shaft section which, in turn, leads to a change in height and longitudinal position in the longitudinal extension section, which, in turn, leads to a change in height and longitudinal position of the first shaft portion causing a swinging of the interconnection portion and a rotation of the second shaft portion relative to the second position retention device.

An embodiment also has the second extension device as including a first reception sleeve that receives in rotating fashion the first shaft section, a second reception sleeve that receives in rotating fashion the second shaft section and at least one longitudinal link drivingly interconnecting the first and second reception sleeves. For example, the extension device has in an embodiment a pair of laterally spaced longitudinal links which extend for at least 30% of the longitudinal length of the extension device.

An embodiment also includes having the fuel component support device being in the form of a capture tray having an undersurface supported by the longitudinal extension device with the tray and first and second sleeves being in engagement such that longitudinal motion in the first and second sleeves is imparted to the tray free of relative longitudinal slippage between the tray and sleeves (e.g., pairs of meshing projection/projection combinations with one set longitudinally inward and the other set outward as to provide the longitudinal slippage preclusion in either direction of swing/longitudinal adjustment. In other words, the tray and sleeves define male/female abutment combinations that avoid longitudinal slippage in either direction of longitudinal adjustment.

In an embodiment the fuel component support device includes a capture tray having an undersurface supported by the longitudinal extension device, and the capture tray including a base plate and longitudinally extending side walls which diverge laterally out away from respective ends of the base plate, and the fuel component support device further including a rack which is received by the side walls in an intermediate area of the side walls.

An embodiment features the cooking container as comprising an outdoor grill first shell component with a cavity that has a bottom shell wall portion which supports the first position retention device and the fuel component support device includes a capture tray having an undersurface supported by the adjustment mechanism and a fuel component support rack that is supported by the capture tray, and the shell component further including a support surface for receiving a cooking surface rack which is positioned above the fuel component support rack as in opposing edge flange extensions that extend inward of the shell component as to provide a contact surface for the cooking surface rack which can be a rack generally similar in design than the fuel component support rack with an embodiment featuring the former being larger than the latter in overall area.

An embodiment also features a second shell component or lid that is supported by the first shell component and a support base which supports the first and second shell components as in a hinge or hinge set forming means for second shell component or lid adjustment.

An embodiment also has a support base such as a leg assembly which supports the first shell component, and the support base comprising a handle position retention section which receives the handle section and comprises variable height position stop engagement locations. As an example, a support base which receives the handle section and comprises variable height position stop engagement locations. An embodiment of the handle section includes means for releasable engagement and adjustment to a new location which provides for a change in height in the fuel component support device. For example, in an embodiment, the handle section includes a lateral pivot engagement with the first shaft section as to provide for release and reengagement relative to the support base upon a swinging out (e.g., horizontal swing motion) from a first capture slot at the support base and then a vertical adjustment to a second capture slot at the support base (e.g., the support base having an arc shaped portion with the stop engagement locations arranged along that arc as with a sloped orientation).

An additional embodiment includes a cooking apparatus that comprises a cooking container with a fuel component support device receivable in the cooking container and an adjustment mechanism drivingly connected with the fuel component support device. In an embodiment, the adjustment mechanism includes a handle section and an interconnected shaft assembly connected with the handle section. The interconnected shaft assembly including a first shaft section and a linkage assembly drivingly connected to the first shaft section and positioned between a base portion of the container and the fuel component support device such that rotation of the first shaft section produces a change in vertical height in the linkage assembly and the fuel component support device. A handle engagement section is provided as in one that comprises a plurality of height position stop engagement locations. Also, in an embodiment, the handle section is releasably engageable with the engagement locations as to releasably fix the fuel component support rack at one of a plurality of different height positions. In an embodiment, the handle section includes a lateral pivot engagement with the first shaft section as to provide for release and reengagement relative to the engagement locations. Also, in an embodiment, the support base has an arc shaped portion with the stop engagement locations defining a plurality of slots arranged along the arc and dimensioned to receiver therein a portion of the handle section. Also, the linkage assembly and handle section are arranged such that the fuel component support device is shifted down upon an upward swinging of a handle of the handle section and vice versa.

An additional embodiment of the invention includes a cooking apparatus that comprises a cooking container and fuel support means receivable in the cooking container as well as adjustment means for adjusting in height the fuel component support device within the cooking vessel. The adjustment means in an embodiment includes a lever assembly that is received between a base portion of the cooking vessel and a handle section. An embodiment further includes a handle height position releasable retention means for releasably retaining the handle section in one of a plurality of different height positions following a swinging of a grasp handle of the handle section.

Further featured is a method of assembling an outdoor cooking apparatus that comprises (a) providing a cooking vessel; (b) providing a fuel component support device receivable in the cooking vessel; and (c) providing an adjustment mechanism drivingly connected with the fuel component support device. In an embodiment, the adjustment mechanism includes a handle section and an interconnected shaft assembly connected with the handle section, the interconnected shaft assembly having a first interconnected shaft combination comprising a first shaft section, a second shaft section positioned as to extend generally in a common direction of extension as the first shaft section and an interconnecting section connecting the first and second shaft sections, and a first position retention device which is in position retention engagement with the first shaft section such that an adjustment in position of a handle of the handle section generates a rotation of the first shaft section relative to the position retention device and a change in height in the second shaft section which is in height position changing engagement with the fuel component support device.

BRIEF DESCRIPTION OF THE DRAWINGS

FIG. 1 shows a front perspective view of a first embodiment of a cooking apparatus of the present invention in the form of a grill assembly;

FIG. 2 shows a front elevational view of the same;

FIG. 3 shows a top plan view of the same;

FIG. 4 shows a right side elevational view of the same;

FIG. 6 shows a front perspective view of the base assembly of the grill assembly of FIG. 1;

FIG. 7 shows a front elevational view of the base assembly of FIG. 6;

FIG. 8 shows a top plan view of the base assembly;

FIG. 9 shows a right end elevational view thereof;

FIG. 10 shows a left end elevational view thereof;

FIG. 11 shows a front perspective view of the base support structure and adjustment mechanism or lift assembly of the first embodiment grill assembly;

FIG. 11A shows an enlarged view of the circle A portion in FIG. 11;

FIG. 12 shows a front elevation view of the support structure of FIG. 11;

FIG. 14 shows a right side elevational view of the base support structure and adjustment mechanism;

FIG. 15 shows a left side elevational view of the support structure;

FIG. 16 shows a top perspective view of a second embodiment of a grill assembly under the present invention FIG. 17 shows a front elevational view of the second embodiment grill assembly;

FIG. 18 shows a top plan view of the second embodiment grill assembly;

FIG. 19 shows a right end elevational view of the second embodiment grill assembly;

FIG. 21 shows a front perspective view of the base assembly of the second embodiment together with the fuel component support device;

FIG. 22 shows a front elevational view of that which is shown in FIG. 21 with the lift assembly and fuel component support device shown in dashed lines within the base shell;

FIG. 23 shows a top plan view of that which is shown in FIG. 22

FIG. 24 shows a right side and elevational view of that which is shown in FIG. 22; and FIG. 25 shows a left side and elevational view of that which is shown in FIG. 22.

FIG. 26 shows a front perspective view of the base support structure and lift assembly of the second embodiment grill assembly;

FIG. 26A shows an enlarged view of the circle A portion in FIG. 26;

FIG. 27 shows a front elevation view of the support structure of FIG. 26;

FIG. 28 shows a top plan view of the support structure;

FIG. 29 shows a right side elevational view of the support structure;

FIG. 39 shows a front perspective view of an additional embodiment of a grill assembly of the present invention;

FIG. 40 shows a front elevational view of that which is shown in FIG. 39;

FIG. 41 shows a top plan view of the same;

FIG. 42 shows a right side elevational view of the same;

FIG. 43 shows a front perspective view of the base support structure and adjuster mechanism or lift assembly of an additional embodiment of a grill assembly;

FIG. 43A shows an enlarged view of the circle A portion in FIG. 43;

FIG. 44 shows a front elevation view of the support structure of FIG. 43;

FIG. 45 shows a top plan view of the support structure and adjuster or adjustment mechanism;

FIG. 46 shows a right side elevational view of the support structure and adjuster mechanism;

FIG. 47 shows a front perspective view of the base support structure and adjuster mechanism or lift assembly of an additional embodiment of a grill assembly;

FIG. 47A shows an enlarged view of the circle A portion in FIG. 47;

FIG. 48 shows a front elevation view of the support structure of FIG. 47;

FIG. 49 shows a top plan view of the support structure and adjuster mechanism;

FIG. 50 shows a right side elevational view of the support structure and adjuster mechanism;

DETAILED DESCRIPTION OF EXEMPLARY EMBODIMENTS OF THE INVENTION

Figure 5:
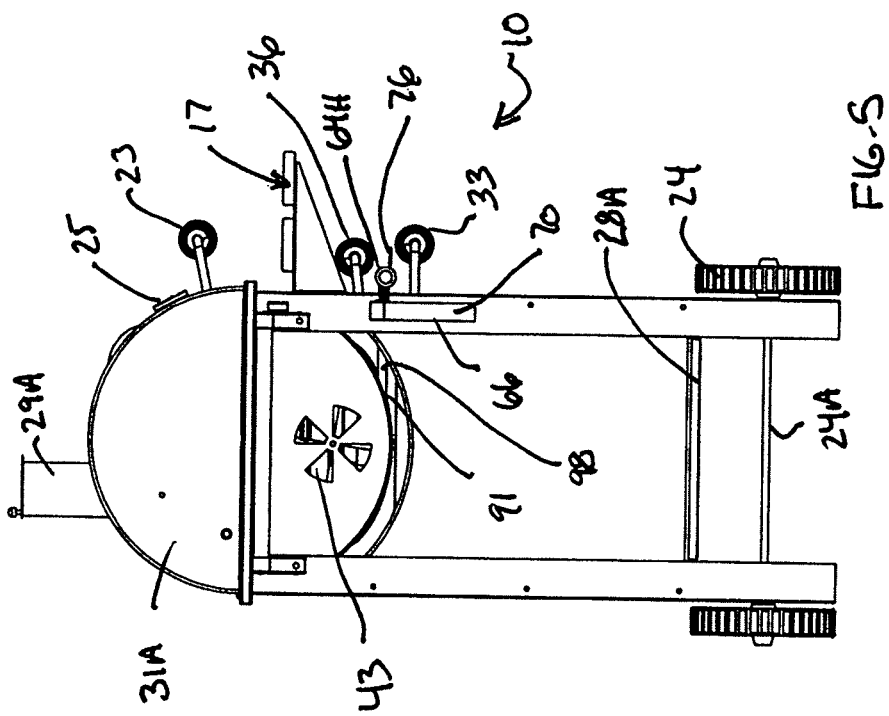
FIG. 5 shows a left side elevational view of the same.
Figure 13:
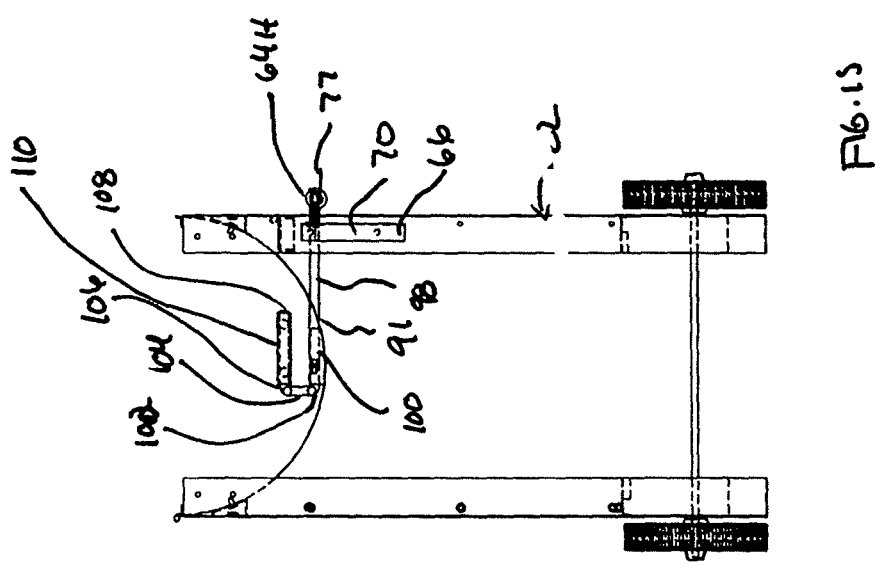
FIG. 13 shows a top plan view of the base support structure and adjustment mechanism.
Figure 20:
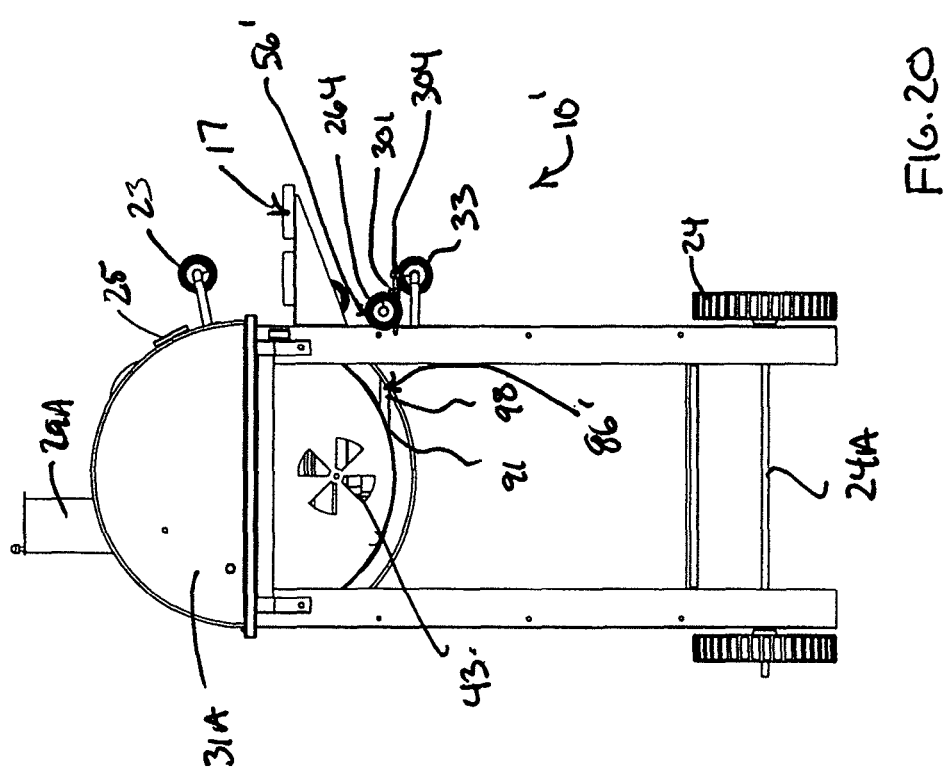
FIG. 20 shows a left end elevational view of the second embodiment grill assembly.
Figure 30:
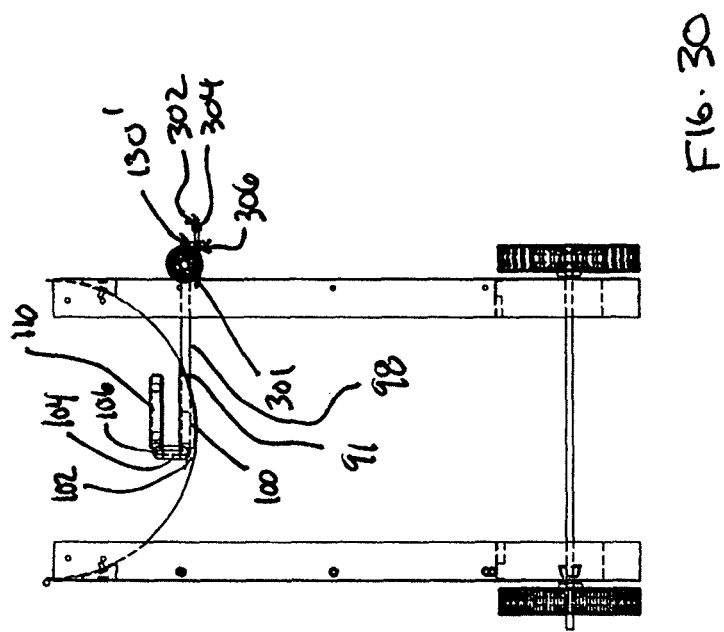
FIG. 30 shows a left side elevational view of the support structure.

FIG. 1 shows a front perspective view of cooking apparatus 10 in an exemplary form as a grill assembly. Grill assembly 10 has base assembly 12 and lid 14 hingedly attached, with attachment means such as hinge 15, to base shell 13 of base assembly 12. Base assembly 12 further supports accessory items in the form of side table 16 to one side (e.g., the left side as shown), second, front table 17 and firebox or smoker attachment 18 on the opposite side (e.g., the right side as shown). In this exemplary embodiment, grill assembly 10 is in the form of a barrel shaped grill assembly with lid 14 and base shell component 13 shown in respective half-barrel form. Lid 14 is shown as supporting lid handle 23, temperature gauge 25 and a set of flapper covered exhaust ports 29A and 29B. Lid 14 is also shown as an encasing body 31 with the concave upper cover section 31C and generally semi-circular end covers 31A and 31B (preferably with flange overlap relative to the free ends of cover section 31C for facilitating securement). The illustrated half-barrel grill design is but one of a wide variety of cooking container configurations suited for use under the present invention, with an elongated (e.g., rectangular) base shell component being suited for the adjustment mechanism of the present invention described below, although, as also discussed below, other shapes such as circular, box-like, etc. are also illustrative of exemplary cooking embodiments of the invention. This includes integrated base and side wall(s) as well as encircling containment.

Also, while grill assembly 10 is shown with various attachments as in smoker attachment 18 (shown as comprising reception housing base 32 and cover 34 with handle 36), the invention is inclusive of a wide variety of grill assembly configuration and types with or without accessories and/or attachments, including but not limited to egg shaped grill devices, square or rectangular box like shell and lid combination grill assemblies, circular periphery cylindrical shell and lid combination grill assemblies, open top grill devices including those having the aforementioned configurations, etc.

Base assembly 12 is shown, for example, in FIGS. 1 and 6 as having base shell component 13 supported by base support structure 20, which in this embodiment includes a set of legs 22 (e.g., a set of four legs 22A to 22D) although alternate cooking container support means are featured as in a single pedestal or pole stand support means, collapsible leg assemblies as support means as well as "no-leg" grills that are designed to be table supported, etc. and thus are provided with a suitable shaped bottom to provide the support means relative to an underlying support surface.

In the embodiment illustrated, legs 22 are represented by four independent legs 22A to 22D and are shown as angle rods. The sub-set of legs that includes 22A and 22B is shown being of a longer length relative to the opposite end leg sub-set 22C and 22D (which arrangement accommodates for the height of wheels 24 with wheel set axle 24A for making the grill assembly more easily portable), although non-portable grill assemblies are also featured under the present invention. The upper ends of legs 22A to 22D are secured to respective corners of base shell component 13 (e.g., a permanent weld or releasable fastener as a few examples of securement means). Further, there are preferably provided a set of corresponding curvature fill-in contact supports 21A to 21D to better secure base shell component 13 to legs 22.

With references to FIGS. 1 to 5 there is further illustrated bracing 26 with left end and right end lower brace bars 28A, 28B and bottom front brace bar 27 (rear equivalent provided but not shown) which in conjunction with legs 22 and base shell component 13 provides a framed enclosure for supporting front door set 30 of doors 30A and 30B with handles 33. In the illustrated embodiments there is further provided end plates 35 (only right one shown in FIG. 1) which, in conjunction with the aforementioned door set 30 and bracing 26, provide cabinet-like structure 37 under shell 13. Again, a grill assembly with a cabinet like structure, provided as an added accessory to the base assembly positioned below the base shell component, is but one example of the various designs featured under the present invention which alternate designs are inclusive of "cabinet-less" designs.

With reference to FIGS. 6 to 10, there is illustrated grill assembly 10 with the lid and the above noted attachments (e.g., smoker attachment 18, cabinet structure 37, and table attachments 16, 17) removed for added visibility. Thus, base assembly 12 is shown with legs 22 and bottom base shell component 13. As seen, base shell component 13 is comprised of enclosure base 38, which in the illustrated embodiment includes a semi-cylindrical shaped body 40 (preferably forming ½ of the overall barrel shaped grill assembly when taking into consideration lid 14 as the other barrel half) together with generally semi-circular enclosure end caps 42A and 42B.

As further seen from FIGS. 6 and 8, each of end caps 42A and 42B is preferably provided with adjustable flow introduction port means 43 (e.g., fan shaped apertures formed in the respective end plates with a mounted, rotatably adjustable fan-shaped sliding plate to change the percentage of opening of those apertures).

FIGS. 6 and 8 further illustrate capture device 44 which is shown as being a tray with a generally U-shaped cross-section with two sloped side walls 44A, 44B and a central horizontal region 44C therebetween. As seen in FIGS. 7-9, the sloped side walls 44A and 44B extend out into close proximity or contact with the base shell component on each side and also extend between the end caps 42A and 42B (which are shown extending in common with central region 44C). In the embodiment illustrated there is featured a gap space between at least one of the ends of the capture device 44 and an adjacent most side wall 44A and 44B to accommodate a degree of horizontal shifting during an arc swing of capture device 44 upon being adjusted in height adjustment mechanism 56 described in greater below. For example, a lowermost setting places a larger gap between a first end of the capture device and an adjacent most side wall amongst side walls 44A and 44B, while in the opposite maximum lift state, there is a larger gap formed between the opposite end of the capture device and the adjacent most one of side walls 44A and 44B. Further, the fuel component support device 46 (e.g., a rack) is preferably fixed to capture device (e.g., a weld arrangement or removable fastening arrangement as in a latch clamping arrangement) such that capture device 44 and support rack 46 form a fuel component support device that shifts as a unit, although alternate embodiments include a non-fixed relationship as in simple resting in position or temporary positioning means as in contact position holding projections, or other position maintenance means. Also, support rack 46 is shown in the exemplary embodiment as having generally the same length as that of capture device 44 such that capture device 44 can provide a convenient food or fuel supply residue or waste containment device (e.g., an ash container) with minimized missed spillage. Further, there is illustrated plating with an example being providing full periphery plating (e.g., adding end plating flanges 44E1 and 44E2 which are shown as being of partial height as to provide a peripherally enclosed capture tray.

In an embodiment, the fuel that is utilized is comprised of individual fuel elements as in charcoal or wood briquettes or other solid fuel heat sources including combustibles as noted as well as individual heat absorbers such as "lava" rocks heated by an additional heat source as in a gas, infrared, electric resistance, etc., heat source.

FIGS. 6 to 10 further illustrate fuel element or component support rack 46 having elongated side rods 48, 50 extending parallel along opposite respective side walls of the base shell component 13 and which can be utilized as weld or fixation locations relative to the respective sloping side walls 44A and 44B of capture device 44. Shown extending transversely between side rods 48 and 50, are a plurality of width rods 52 which are spaced along the length of side rods 48 and 50 with a sufficiently small enough spacing as to provide support to the desired fuel elements placed on support rack 46 as in charcoal briquettes (not shown). In this embodiment, there is only the opposite side rods 48 and 50 extending longitudinally, although in alternate embodiments, such as support racks designed to cover large surface areas, additional longitudinal support rods are provided in some embodiments, as in one or more intermediate, parallel extending support rods attached (e.g., welding—as with all of the noted support bars and rods 48, 50, 52) to the width rods 52. Further support rack 46 is shown as having opposite end handles 54, 55 (e.g., bent rods) at the shorter width ends of the illustrated rectangular shaped support rack.

As noted above, in an exemplary embodiment, the opposing longitudinal sides (e.g., rods 48 and 50) of support rack 46 are designed to contact and rest upon intermediate regions of the respective sloped side walls 44A and 44B of capture device 44 as in a fixation arrangement such as a permanent weld or a locking mechanism such as clamps or alternate holding or positioning means. Alternatively, reliance can be placed on the wedge nature of the sloping capture device supports walls as in having a support rack is generally self centering and placed in fixed position under its own weight, although in view of the heated fuel support function of grate 46, there is preference to have at least some position stabilization or retention as in positioning means with capture projections (not shown—e.g., hook shaped projections) such as projections (e.g., bumps) extending in from the capture device sloped walls designed to fix in position support rack 46 to the capture device 44 until a desired release is implemented by a user. Also, while a rod assembly is featured as a preferred support rack 46, various other fuel support devices are featured under the present invention as in a unitary plate with perforations for providing for ash and/or food waste to pass or even a generally non-apertured plate is featured under the present invention (e.g., removal of ash at a common level with fuel element support, etc.)

With reference to FIGS. 6 to 10 as well as FIGS. 11, 11A and 12 to 14, there is described height adjustment mechanism (or lift and drop height adjustment assembly) 56 which mechanism provides a means for lifting and lowering the fuel component support device 43 which comprises, in this embodiment, capture device 44 and the received fuel component support rack 46 to a desired height relative to an above positioned food support device (not shown—as in an additional food support "rod" rack or grate positioned above and preferably in parallel relationship to the lower positioned fuel support rack 46 or some alternate food support mechanism as in a single or multi-prong pierce or surround support with or without a rotisserie rotation mechanism—an example of which includes a single pierce rod or left and right piercing rods or a cage support(s), as well as other food support means relative to the heat source).

A suitable support device 59 for supporting the food support rack or the like, is shown in FIGS. 11 and 14 as opposite side support flanges 60, 62 which extend inwardly just below the uppermost longitudinal edges of base shell component and upon which the side edges of the non-illustrated food support rack can rest. Thus, in this embodiment the food support remains stationary in height while the fuel support rack is adjusted although alternate embodiments include adjustable food support racks (alone (e.g., having the adjustment mechanism moving the food support rather than the fuel support grate—which is less preferably in most embodiments due to the heat source positioning) or in combination with an adjustable fuel support rack (e.g., an alternate lifting device or a common one used to lift and/or drop both racks at same time)).

Adjustment mechanism 56 is shown in this embodiment as having a handle section that is releasably engageable with a handle engagement section represented in this embodiment by adjustment lock base 64 comprising in the illustrated embodiment support plate 66 with an interior edge 68 mounted to an upper region of leg 22A and an opposite curved edge 70 with a plurality of spaced apart pin reception apertures 72 or engagement locations that are shown positioned on a common circumference or arc that lies inward of the handle section 63 having circumference represented by the exposed outer edge 70 of support plate 66. There is further shown handle section 63 having handle 64H which is joined or extends from the exterior end of handle shaft 74 also forming part of handle section 63.

Further associated with handle shaft 74 is toggle adjustment mechanism 76 (FIG. 11A) which comprises toggle lever 77 having a general reverse "Z" configuration with an elongated first part 78 running outward away from handle shaft 74 and an intermediate, second cross over part 80 that extends into a pivot connection with the underside of shaft 74 (as represented by pivot axis pin P FIG. 13) and which includes a third part 82 shown extending along the underside of shaft 74. Also, in the embodiment shown, third part 82 is shown as supporting (inclusive of a monolithic bend portion at third part 82) a bracket member 84 which is shown as providing means for retention of a pin and/or spring. For example, as a means to retain the pin 88, toggle adjustment mechanism 76 further includes pin capture plate of bracket member 84 which is shown as L-shaped or U-shaped bracket member component with a first leg (shown vertically extending) positioned to the outer side of shaft 74 and a second leg extending under the shaft 74 and, optionally, a third leg positioned on the interior side of shaft 74 and designed to engage the interior end portion of the below described return spring 92. That is, there is featured in an exemplary embodiment of the invention compression means to compress the spring 92 upon adjustment of toggle adjustment 76 which features pin 88 having an enlarged head 90 positioned to the exterior side of shaft 74 coupled with an arrangement to either have the pin compress the spring directly as in the pin having an intermediate key projection or the like to contact and compress spring 92 upon bracket member 84 being moved, the below described threaded nut on the pin, or an interior spring end-to-pin weld, etc or to have the bracket member 84 provide the mechanism for compressing the spring and providing for adjustment of the pin under the bias of the spring (e.g., the below described U-shaped bracket with fixed nut component which holds the pin and contacts the spring)

Thus, in the embodiment shown in FIG. 11A there is featured an embodiment of setting and releasing device 130 or means for releasable engagement and adjustment, comprising pin 88 extending through capture plate 84 at its pin head end, then through an aperture formed in shaft 74 before passing through a spring or bias device 92. Pin 88 is biased into a locked state relative to the pin capture apertures 72 formed in plate 66 via the above described compression means. Thus upon a hand squeeze of lever 77 (while the same hand is grasping as well the handle 64H) the pin head is moved away from the shaft 74 against the bias of the spring as to move the pin out of its capture relationship with the pin aperture 72 and thus into a release state relative to plate 66. Further, the spring is compressed as bracket 84 and the retained pin 88 shift outward away from the shaft 74 while drawing the spring's interior end toward the shaft 74 in contact with the spring's opposite end. Also, lever 77 can be modified to provide improved hand grasp feel as in an angled or curved exterior side configuration (e.g., a downward bend to provide an angled cross-section in lever 77 where the hand contacts—not shown).

As further shown in FIG. 11A, shaft 74 of adjustment mechanism 56 extends into a curved section 94 as in an integral rod bend or, as shown, a jointing catch member 96 which brings shaft 74 into engagement with curved section 94

(although any or all of the shaft parts can be made as an monolithically integrated—e.g., bent rod structure rather than joined together shaft sections or vice versa). In addition, curved or bent section 94 is received within a notch or aperture 90 formed in leg 22A as shown in FIGS. 6 and 11A.

Lifting mechanism 56 further comprises first rotation shaft or first shaft section 98 shown extending in a preferred widthwise and horizontal orientation. First rotation shaft 98 is shown extending through aperture 91 formed in the base shell component 13 and into and through first pivot retention device or support 100 which is preferably a single pivot reception sleeve (or multiple reception sleeves as in left and right end positioned reception sleeves) or other means for positioning with free rotation. In the illustrated embodiment, first position retention device or sleeve 100 is fixedly secured as by a weld or bracket fastener to the underlying interior surface of base shell component 13 (e.g., support locations which span across the deepest portion of base shell component 13).

As shown in FIGS. 11 to 14, there is further featured second bend section 102 (FIG. 13) at the far end of shaft 98 which leads into first rise extension 104 which is in the form of an interconnecting section and which extends into third bend section 106 followed by second shaft section 108. Bend section 106 is arranged as to have shaft section 108 extend widthwise back in the opposite direction of the extension direction of shaft section 98 such that a parallel arrangement is provided between "shafts" or shaft sections 98 and 108. Also, second shaft section 108 is received within first floating pivot sleeve 110 which also provides a component of a longitudinal extension device designed to extend along under the fuel component support device 43.

As shown in FIG. 7, first floating pivot sleeve 110 is preferably placed in contact with capture device 44 as in a free release arrangement or a more integrated relationship as in an independent full or partial cylindrical sleeve or sleeves (such as sleeves 109A and 109B shown in FIG. 8 ("sleeving")) mounted (fixedly or a removable capture arrangement) to the underside of capture device 44 as in the intermediate portion 44C or a reconfigured capture device arrangement as in a capture plate having formed therein reception sleeving (e.g., stamped and curved projection(s) extending from the underside of a plate portion of capture device 44) to pivotally attach to or provide position fixing relative to the pivot sleeve 110. Thus, the aforementioned longitudinal extension device is preferably a separate component relative to capture tray for ready disassembly although a portion of the capture tray can double as a portion of the longitudinal extension device.

In the embodiment illustrated in FIG. 7, there is shown first position retention device or positioner 109A which represents a projection extending down from the underside of capture device 44 as to lie just longitudinally inward of sleeve 110, while on the opposite side there is a second projection 109B that is just inward of the opposite (below described) sleeve 114. As explained in greater detail below, projections 109A and 109B provide position retention between the adjustment mechanism and capture tray or plate during periods of non-activation and activation of the adjustment mechanism, wherein the capture device 44 and sleeves 110 and 114 are lifted and lowered (and also horizontally shift during an arc movement in the illustrated embodiment). Additional position projection arrangements are also featured as in placing both projections 109A and 109B on the outer side of each respective sleeve rather than the illustrated arrangement with each on the interior side of the sleeves (see the below discussion regarding projections 109C and 109D). Also, the projections can be solid members as in solid rods, or non-solid members as in cylindrical sleeves or brackets, flanges etc., held in position to the underside of capture device 44. They preferably also have a length which provides limited widthwise adjustment between the capture device 44 and the supporting portion of the adjustment mechanism as in a width essentially corresponding to the widthwise spacing of the below described upper linkage bar set or grate support bars 112 represented by bars 112A and 112B and forming part of the aforementioned longitudinal extension device in this embodiment.

For example, in the longitudinal extension device 109 of adjustment mechanism 56 there is further provided at least one and preferably a plurality (e.g., 2 as shown) of grate support bars or links 112 that are secured to and extend away from the first floating pivot sleeve 110. In an exemplary embodiment, grate support bars 112 (e.g., grate support bars 112A and 112B) are spaced widthwise as to cover at least 25% as in 30 to 50% of the intermediate region of capture device 44 or of the grate's underlying surface and also extend for 30% or more of the longitudinal length of the capture tray as in 70% or more.

At the opposite end of the grate support bars is found the earlier noted second floating pivot sleeve 114 which is also preferably secured to the free ends (opposite free ends) of bars 112A and 112B as in a weld or fastener bracket attachment to sleeve 114. Sleeve 114 is also sized to receive in sliding-rotation fashion shaft portion 116, which preferably falls on a common horizontal plane and extends widthwise in parallel fashion with second shaft section 108 (as well as preferably in parallel fashion first shaft section 98). Also, sleeve 114 is preferably associated with capture device 44 in similar fashion as first sleeve 110. The term "floating" is inclusive of being able to adjust the sleeve in position in height such that the capture device 44 and the fuel component support rack 46 is able to move up and down to the desired position as described further below. Floating can also comprise a degree of horizontal shifting in the supported capture device 44 as in the linkage arc movement featured in the illustrated embodiments or only vertical height adjustment in the capture device 44 and fuel support grate 46 (e.g., by way of added vertical slot retainment plates receiving a sleeve or rotation shaft relative to the linkage assembly with the sleeve/pivot shaft friction slippage accommodating the horizontal movement prevention provided via the one or more retainment plates or the like). In an alternate embodiment, there is removed the capture device and there is provided a more direct support relationship between the adjustment mechanism 56 and the fuel component support rack 46 or vice versa with the capture device providing alone the fuel component support (e.g., another example of a fuel component support means). An arrangement with a capture device present is preferred in many settings, however, as it provides an added level of contact protection between the shaft/floating sleeve interrelationship from food and fuel waste (e.g., ash) relative to an above positioned fuel support grate.

Also, as seen from a review of FIG. 8, there is seen a linkage assembly as a portion of the adjustment mechanism 56 transmitting the driving force of the handle section that is passed to the first shaft section. As seen, the linkage assembly that is driven by the swinging of the handle section and rotation of the first shaft section 98 involves a degree of horizontal adjustment in the arc swing movement of the sleeves 110 and 114 of the linkage assembly, which horizontal shifting is accommodated by providing the fuel support rack with a shorter longitudinal length relative to the longitudinal length of base shell component 13.

At the non-free end of shaft 116 there is provided bend portion 118 which extends to second rise extension link or interconnecting portion 120 which represents a parallel linkage relative to rise extension 104. Also, each of shaft portions 108 and 116 preferably are provided at their free ends with attached caps CP (FIG. 8) which, in conjunction with the bend on the other end, helps to retain them in position relative to the receiving sleeves 110 and 114 and precludes widthwise pull out. At the lower end of extension link 120 is a further bend section 124 from which extends rotatable shaft portion 126 which is arranged at a common horizontal plane location as first rotatable shaft extension 98. Rotation shaft 126 is received in rotating sliding fashion within second pivot support or second position retention device 128 which is preferably fixed in position like first position retention device 98 (e.g., a welded or otherwise mounted sleeve (inclusive of a partial above sleeve) that is supported by the base shell component 13). The shaft portions 108 and 116 and associated interconnecting portion 120 provide second interconnection shaft combination 545.

As shown in an exemplary embodiment of FIGS. 1 to 15, lifting mechanism 56 includes two fixed pivot supports 100 and 128 receiving respective rotation shafts 98 and 126, which rotation shafts have rise extensions 104 and 120 extending up toward free floating sleeves 110 and 114 receiving (and from which extend) first and second shaft components 108 and 116 and connected to opposite ends of one or more intermediary longitudinal extension bars as in bars 112A and 112B. Accordingly, with lift assembly 56 the sleeves and grate support bars 112A and 112B are adjustable in height (up and down) upon adjustment of handle 64H as further described below.

As seen from above, as an example of a suitable set up for lifting mechanism 56, there is provided a mechanical linkage as in one that comprises a four bar linkage assembly (e.g., a four bar parallelogram linkage assembly) with base shell 13 shown as providing a lower support connection or, in other words, one bar of the four bar linkage. Also in an illustrative embodiment, the adjustment mechanism further comprises linkage adjustment actuator mechanism 86 which provides for adjustment activity in adjustment device 56, which linkage adjustment actuator comprises handle section 63 comprising handle 64H and a handle shaft extension 74 leading to shaft 98 provided at one end of the linkage assembly which, in view of its relatively rigid connection with rise extension 104, can act to drive one end of the linkage assembly (e.g., the linkage assembly's upper support rods 112A and 112B) as to implement movement either up or down depending upon the handle movement. Thus, the fuel component support grate 46, when mounted on top of capture device 44 which in turn is supported by the sleeves 110 and 114 and/or the grate support bars 112A and 112B of the linkage assembly, acts to lift and lower that fuel support grate together with movement (e.g., swinging movement) of the handle section 63 (e.g., a swinging rotation of handle 64H such that its free end adjusts in its vertical height position in a direction opposite to the height adjustment in the fuel component support device as in a swinging down of the handle to implement an upward rise in the fuel component support device.) Also, as illustrated as embodiment of the invention features a single handle grasp handle which provides for complete operation of the adjustment mechanism with a single hand of the operator and on a single side of the grill assembly as in a swing plane parallel and forward of the front face of the grill assembly.

There is further preferably provided releasable engagement and reposition or adjustment mode setting means 130 (as in a combination setting and releasing means for providing for a fixation in adjustment of the adjustment actuator mechanism 86 (and hence adjustment mechanism 56) preferably together with the ability to release that setting at a desired point in time for further adjustment). Also, the setting means 130 can be an entirely independent arrangement relative to the adjustment actuator mechanism 86 or, as presented in the exemplary embodiments shown, can be partially in common with linkage adjustment actuator mechanism 86 (e.g., shared components as in the handle 64H and handle shaft 74). Thus, setting means 130 provides a device for allowing for operation of the adjustment actuator mechanism or, in other words, releases the capability in adjustment actuator mechanism 86 to lift (or lower) mechanism 56 from what otherwise is a fixed position (e.g., a predetermined fixed (at least temporarily) fuel position height).

For example, there is provided releasable engagement and reposition setting mechanism 130 in the form of toggle adjustment mechanism 76 in the first embodiment, which toggle adjustment mechanism features an adjustable pin and pin aperture combination that enables an operator to choose amongst a plurality of height settings (with four height representations featured in the embodiment shown which coincide with the pin apertures although lesser or more adjustment possibilities are featured under the present invention, although that number can be increased or lowered to accommodate the desired setting choices as in having 5 pin reception apertures 72 with an added lower one on plate 66 providing for a higher setting in the capture device once the pin is moved to the lowest most pin aperture setting and vice versa relative to the lowest most height setting positioning). Thus, a user with a hand on the handle 64H can squeeze the toggle mechanism to release the pin 88 received in one of the apertures 72 (and when engaged in the aperture 72 providing a locked height state in adjustment mechanism 56) and free up the capability of movement of handle 64H to a different location which in turn triggers movement in the adjustment mechanism as in a lifting of the linkage assembly shown including the upper bar set 12A and 12B and any component being supported thereby.

Various other releasable engagement and reposition mechanisms or "setting means" are also featured under the present invention with FIGS. 16 to 30 providing an additional example. FIGS. 16 to 30 provides views that generally coincide with FIGS. 1 to 15, but with a modified lift assembly 56' based on a modified adjustment actuator mechanism 86'. The second embodiment of FIGS. 16 to 30 further includes an alternate setting means 130' (e.g., a modified release and lock combination assembly).

As seen in FIG. 26A, adjustment setting actuator 86' comprises handle 264, which in the illustrated embodiments is a coiled handle for heat dissipation purposes. Handle 264 forms part of adjustment actuator mechanism 86' which provides for adjustment of the height adjustment mechanism 56 (when setting means 130' is in a released state) upon pivoting of the handle relative to a notched reception aperture 290 in leg 22A. Rather than a single hand manipulatable linkage adjustment setting actuator mechanism and setting and releasing means combination as in the previous embodiment, there is provided in FIG. 26A a two hand combination arrangement with a first hand involved with an adjustment of the setting means 130' and a second hand involved with manipulation of the handle (e.g., swinging of the handle 264 relative to a vertical plane) and hence the lifter adjustment 56' or a sequenced single hand manipulation. In this embodiment, a downward swinging of the handle leads to a lifting of the fuel component support device while a swinging in the opposite direction generates a lowering of the full component support device in the illustrated embodiment.

Thus, as seen in FIGS. 26 and 26A, for example, the pin assembly 302 comprises pin 301 with handle 304 with the pin received within pin housing 306. Pin housing 306 is shown secured to shaft 274 (e.g., the underside by way of a weld or similar securement means). Within housing 306 is provided spring 308 which biases the pin 301 into an engagement state with a desired one of the apertures 72 formed in pin capture plate or handle position retention section 66. Thus to make an adjustment in fuel component support plate 46, the operator pulls out on pin handle 304 with one hand while grasping the main handle 264 with the other. Once the pin is clear of the engaging pin hole, a swinging of the handle by an operator about an arc allows the operator to align the pin with another pin hole 72 wherein, if the pin handle is released, the pin will snap into position via biasing spring 308 (this release and biased return engagement being similar in function to the above described 130 setting means operation in this respect). Thus, upon release of handle 304 and an engagement of pin 301 into a different hole setting (e.g., one of the variable handle height position stop engagement locations), adjustment mechanism 56' is repositioned such that so too is capture device 44 and fuel component support grate 46.

FIGS. 22 and 23 also illustrate an embodiment featuring first positioner 109C, which represents a projection extending down from the underside of capture device 44 as to lie just longitudinally outward of sleeve 110, while on the opposite side there is a second projection 109D that is just outward of the opposite (below described) sleeve 114. As explained in greater detail below, projections 109C and 109D provide readily releasable position retention (a longitudinal slippage limiting arrangement) between the adjustment mechanism and capture plate during periods of non-activation and activation of the adjustment mechanism wherein the capture device 44 and sleeves 110 and 114 are lifted and lowered (and also horizontally shifted during an arc movement in the illustrated embodiment). Alternate embodiments include position retention means as in a semi-cylindrical connection with one or two of the sleeves with just contact members at the other side if only one is utilized, brackets or flanges (extending up or down) or alternate positioning means.

Various other setting means are also featured under the present invention with FIGS. 31 to 38 providing an additional example. FIGS. 31 to 38 provide views that generally coincide with FIGS. 1 to 15, but with a modified lift assembly 56" based on a modified adjustment actuator mechanism 86". The embodiment of FIGS. 31 to 38 further includes an alternate setting means 130" (e.g., a modified release and lock combination assembly).

Figure 35:
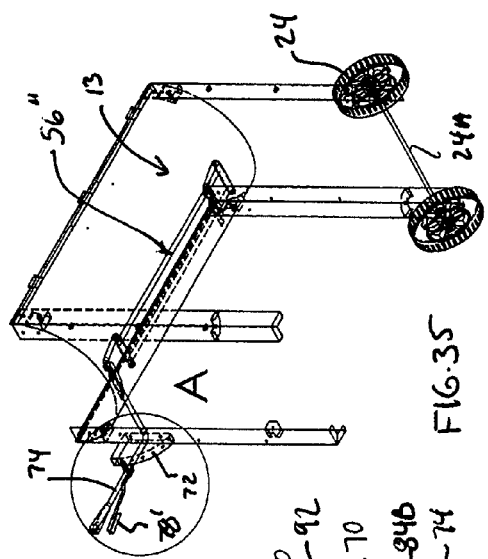
FIG. 35 shows a front perspective view of the base support structure and adjustment mechanism or lift assembly of the alternate embodiment grill assembly.
Figure 35A:
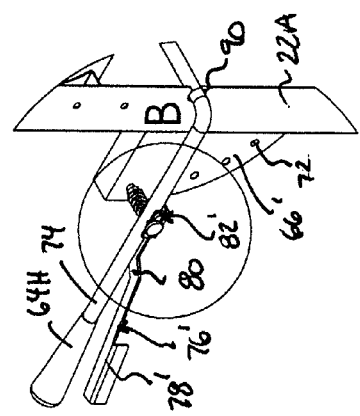
FIG. 35A shows an enlarged view of the circle A portion in FIG. 35.
Figure 35B:
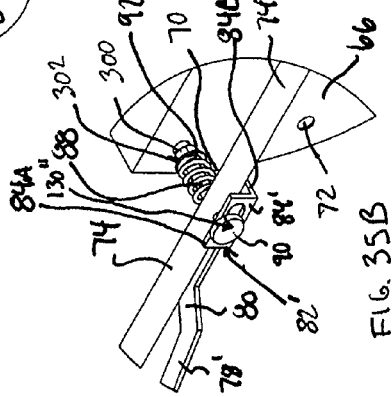
FIG. 35B shows an enlarged view of the circle B portion in FIG. 35A.

As seen in FIGS. 35A and 35B in greater detail, adjustment setting actuator 86" comprises handle 64H which in this illustrated embodiment forms part of adjustment actuator mechanism 86" which provides for adjustment of the height adjustment mechanism 56" when setting means 130" is in a released state and upon pivoting of the handle relative to a notched reception aperture 90 in leg 22A. Rather than a two hand manipulatable linkage adjustment setting actuator mechanism/setting and releasing means combination as in the second embodiment described above, there is provided a single hand combination arrangement similar to the first embodiment. Also, the toggle lever 76" is modified as to have a bent end 78' which is comfortably grasped by an operator (although the present invention further includes added padding or covering material for even greater comfort in place of the other bar only embodiment). Adjustment mechanism 56" is shown in this embodiment as comprising adjustment lock base 66', with a plurality of handle position stop engagement locations, which is similar to the first embodiment but features an added pin reception aperture 72 (five shown instead of four). As with the first embodiment, further associated with handle shaft 74 is toggle adjustment mechanism 76' which comprises toggle lever 77' having a general reverse "Z" configuration with an elongated first part 78' running outward away from handle shaft 74 and an intermediate, second cross over part 80 that extends into a pivot connection with the underside of shaft 74 and which includes a third part 82' shown extending along the underside of shaft 74.

Also, in the embodiment shown third part 82' is shown as supporting bracket member 84' which is shown as providing means for retention of a pin and/or spring. For example, as a means to retain the pin, toggle adjustment mechanism 76' further includes pin capture plate mechanism 84' which is shown as an L-shaped bracket member component with a first leg 84A (shown vertically extending) positioned to the outer side of shaft 74 and a second leg 84B extending under the shaft 74, a nut 300 that works (alone or in combination with washer 302) to cause the spring 92 to compress upon toggle 76' adjustment. That is, washer 302 is shown as designed to engage the interior end portion of the return spring 92 while being retained by nut 300 positioned on the interior side and threaded to the pin 88. Accordingly, pin 88 has its head 90 positioned to the exterior side of shaft 74 and its body extending through shaft 74 and is threaded on nut 300. Thus upon a swinging of handle 64H after the setting means 130 is released, the pin can be aligned with any one of the apertures 72 formed in plate 66 during an arc or swing adjustment in the handle 64H. In other words, upon a hand squeeze of lever 77' (while the same hand is grasping as well the handle 64H) the pin head is moved away from the shaft 74 against the bias of the spring 92 as to move the pin out of its capture relationship with the engaging one of the five pin apertures 72 and thus into a release state relative to plate 66' whereupon it is free to be adjusted (e.g., swung along a vertical plane) and the pin reengaged within the desired one of apertures 72.

Figure 32:
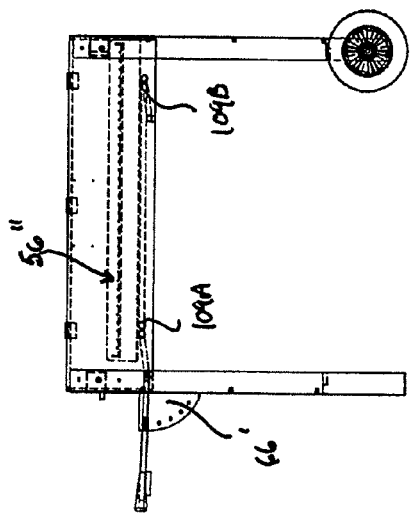
FIG. 32 shows a front elevational view of the base assembly of FIG. 31 with the fuel support grate in a lowered, lowermost state.
Figure 33:
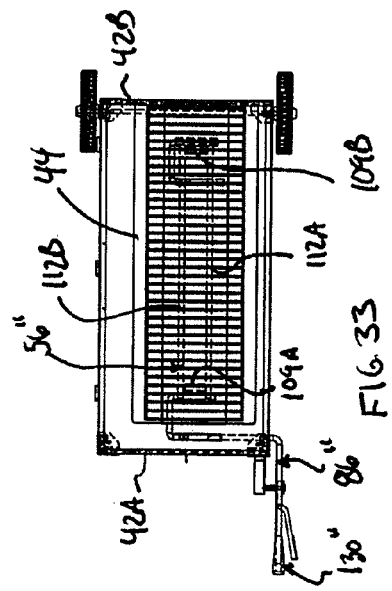
FIG. 33 shows a top plan view of the base assembly with the fuel support grate in a lowered, lowermost state and the handle section in an uppermost height or swing state.
Figure 34:
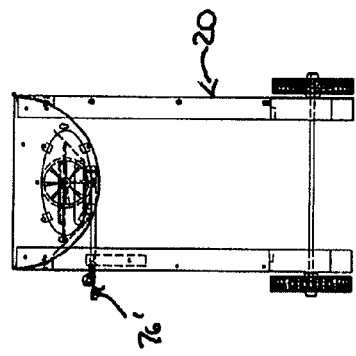
FIG. 34 shows a right end elevational view of that which is shown in FIG. 31.
Figure 31:
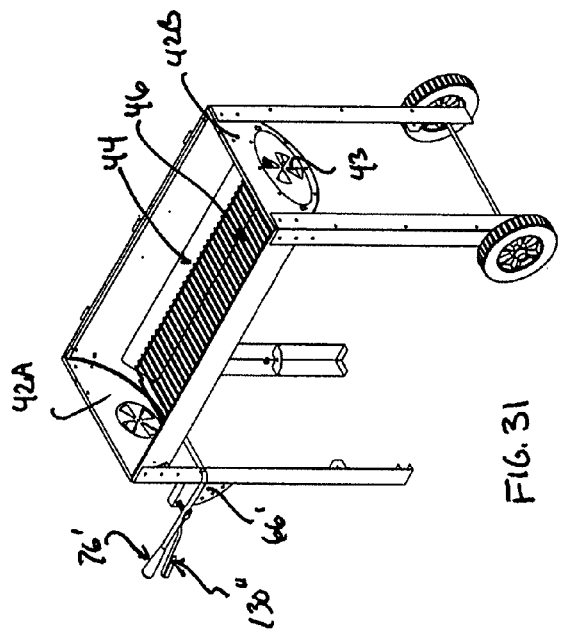
FIG. 31 shows a front perspective of the base assembly of an alternate embodiment grill assembly.
Figure 32A:
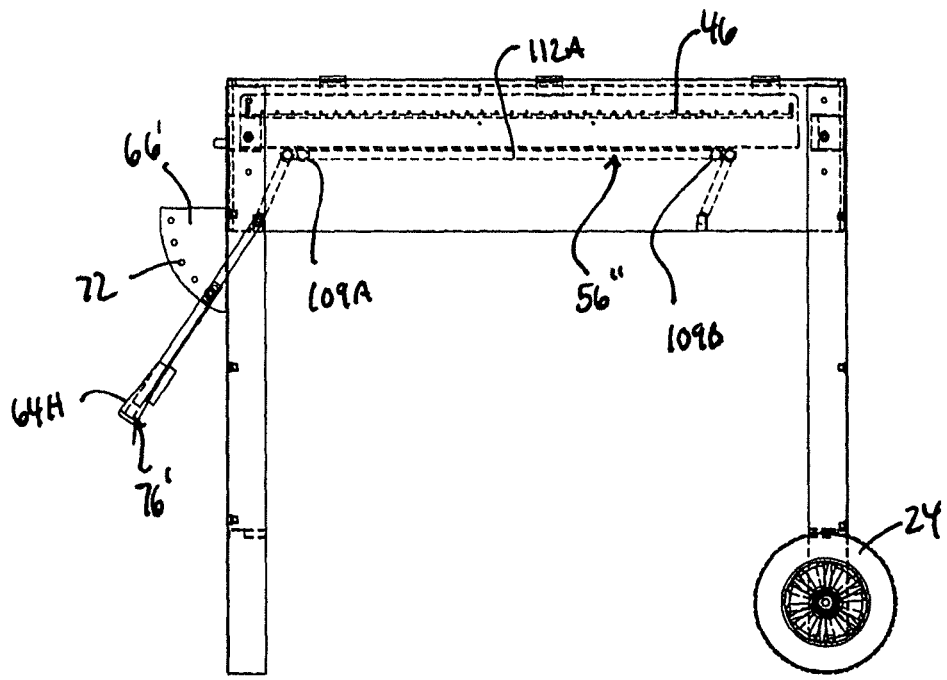
FIG. 32A shows a front elevational view of the base assembly of FIG. 31 with the fuel support grate in a lifted, uppermost state and the handle section in a lowermost height or swing state.
Figure 33A:
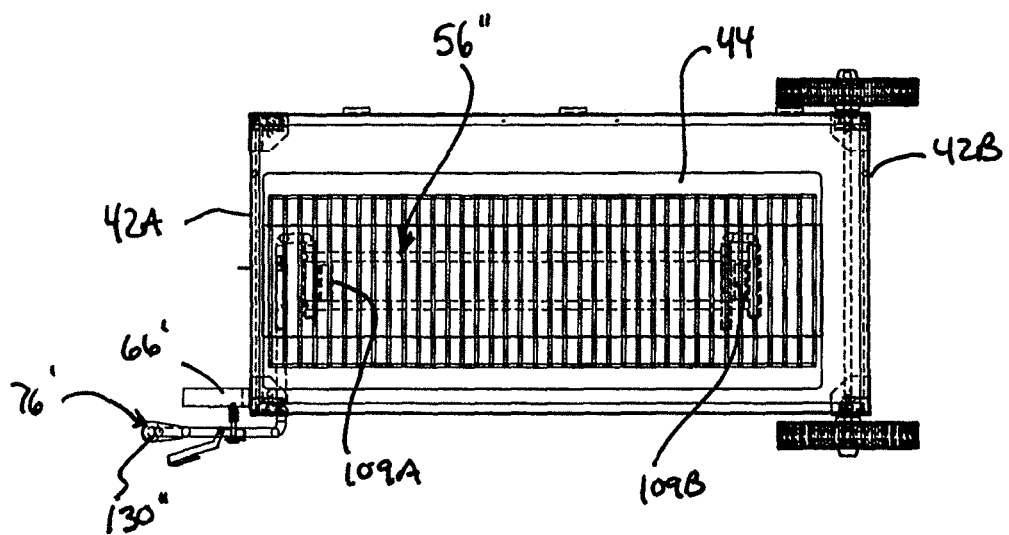
FIG. 33A shows a top plan view of the base assembly with the fuel support grate in a lifted, uppermost state.
Figure 36:
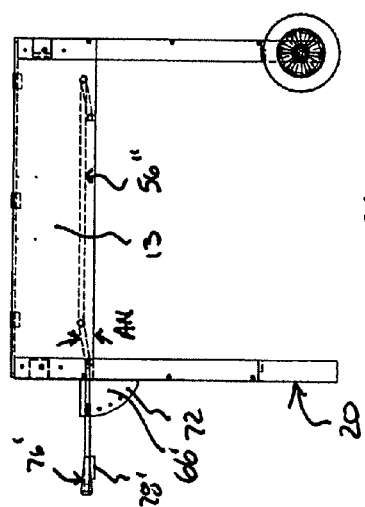
FIG. 36 shows a front elevation view of the support structure and adjustment mechanism of FIG. 35.
Figure 37:
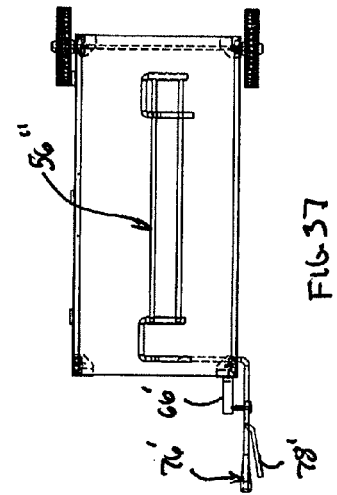
FIG. 37 shows a top plan view of the support structure and adjustment mechanism.
Figure 38:
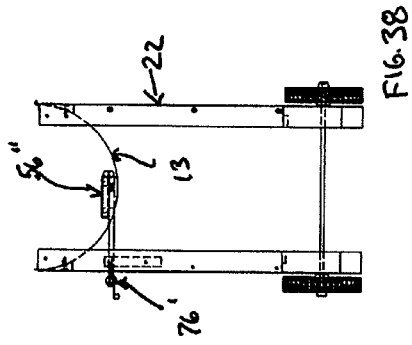
FIG. 38 shows a right side elevational view of the support structure and adjuster mechanism.

From a comparison of FIGS. 32 and 32A and FIGS. 33 and 33A there can be seen the adjustment mechanism in two of the potential five settings represented by pin reception apertures 72 in plate 66'. That is, FIG. 32 shows a front elevational view of the base assembly of FIG. 31 with the fuel support grate in a lowered, lowermost state, while FIG. 32A shows a front elevational view of the base assembly of FIG. 31 with the fuel support grate in a lifted, uppermost state. As seen there is a downward swinging of handle 64H to achieve a raising of the fuel component support device and an upward swing to achieve a lowering of the fuel component support device. Further, FIG. 33 shows a top plan view of the base assembly with the fuel support grate in a lowered, lowermost state, while FIG. 33A shows a top plan view of the base assembly with the fuel support grate in a lifted, uppermost state.

As an alternate example, of a setting and release means (a variation of setting and releasing means 130" and only partially illustrated), toggle adjustment mechanism 76' includes a pin capture plate mechanism 84' as in FIG. 35B but provided with a U-shaped bracket member component (instead of an L-shaped one) with a first leg 84A (shown vertically extending) positioned to the outer side of shaft 74 and a second leg 84B extending under the shaft 74 and a third leg (not shown), which third leg is provided at its upper end with a nut and washer combination that together help in centering the pin position and causing the spring 92 to compress upon toggle 76' adjustment. That is, the nut or associated washer is designed to engage the interior end portion of the return spring 92 with the pin in its threaded in position state within the bracket supported fixed nut. In this way, with pin 88 having its head 90 positioned to the exterior side of shaft 74 and its body extending through shaft 74 and into threaded engagement with a centering nut, the combination of pin and bracket is moved out together as the pin slides within the aperture provided in shaft 74 while the fixed nut, that is moving with the bracket, forces the spring into a biased state. Thus, following a release of the pin 88 and a swinging of handle 64H into a desired new aperture 72 alignment position, a releasing of the lever mechanism results in the biased spring snapping into its new desired position within one of the apertures 72.

While riot intending to be limiting, a height adjustment range in the fuel component support rack of, for example, 1 inch to 8 inches is well suited for many uses of the present invention, with an arc swing range of 0 to 45° to 0 to 120° with "0" taken as horizontal in the exemplary embodiments and more preferably to 0 to 90°. Also a parallelogram linkage arrangement (with the shell base providing a fixed in position bottom linkage bar) together with a double rod upper support platform (12A and 12B) with a pair of single rod riser extensions and a pair of pivot shaft components at the ends of these riser rods and a pair of fixed in longitudinal position lower pivot shafts is illustrative of an exemplary linkage arrangement under the present invention. Other linkage arrangements featured under the present invention include, for example, utilization of U-shaped opposite side riser extensions with intermediate upper and lower pivot shafts and pivot shaft components in place of the single bar riser extensions.

With reference to FIGS. 39 to 46 there is seen an additional embodiment of a grill assembly referenced as grill assembly 368. Grill assembly 368 has some common attributes as those described above in FIG. 1 and thus some common number referencing is presented. Grill assembly 368 also is shown in FIG. 39 as having a similar half-barrel form lid 14 and base shell 13 combination together with the shelf members 16 and 17. There is, however featured a modified base assembly 312 in that base 20' is in a different form as in the embodiment of FIG. 1. As seen, base assembly 20' comprises support base structure 320 comprised of a pair of leg bars 321A and 321B which are each shown in U-shaped form and positioned to opposite longitudinal sides of component shell 13. Suitable bent tubing as in sections of tubing that are assembled with various angles or curves to provide the general U-shaped is suited for forming the pair of U-shaped leg bars 321A and 321B which are shown as providing a set of four individual leg extensions 322A to 322D. The sub-set of legs that includes 322A and 322B is shown being of a longer length relative to the opposite end leg sub-set 322C and 322D (which arrangement accommodates for the height of wheels 24 with wheel set axle 24A for making the grill assembly more easily portable). The upper horizontally extending portions 321H and 321G of bars 321A and 321B are each preferably secured to base shell component 13 as by the illustrated fasteners 325.

Support structure 320 is further shown as having additional bridge supports 326A and 326B which are shown as T-shaped plate members extending between respective pairs of upper bends provided in each of bars 321A and 321B. Further, a base support rack 328 is further provided and connected to the bottom region of each of legs 322A to 322D.

An additional alternate feature of grill assembly 368 as compared to that of FIG. 1 includes a modified adjustment mechanism shown in the form of adjustment mechanism 356 which is similar to adjustment mechanism in its linkage arrangement (e.g., starting with first rotation shaft section 98 and moving downstream with respect to linkage assembly activation). As with the earlier embodiment, there is provided support plate 66' having five (5) spaced apart pin reception apertures 72 that are shown positioned on a common arc circumference that lies inward of the circumference represented by the exposed outer edge of support plate 66'. There is further shown handle 364 which is joined or extends from the exterior end of handle shaft 374 in similar fashion to the FIG. 1 embodiment but for handle 364 having a different bend orientation with the bend being shown at angle A2 (FIG. 45) along a horizontal plane bisecting handle 364. A suitable angle A2 is 0 to 90 degrees with 0° being representative of the straight extension orientation of the FIG. 1 embodiment, while the current bend angle A2 shown in FIGS. 39 to 46 is shown as being about 45° (e.g., 45°+/−5°). As further shown, associated with handle shaft 374, is toggle adjustment mechanism 376 which comprises toggle lever 377 having a general reverse "Z" configuration with an elongated first part 378 running outward away from handle shaft 374 and an intermediate, second cross over part 380 that comprises sub-sections 381 and 382 providing for the 90° bend and which extends into a third section 382 supporting the pin 88 contact bracket assembly 84 which moves out the pin upon hand grasp of toggle assembly 376 via the rotation about pivot axis P3. Further, as seen by FIG. 45, the toggle lever's first part 378 extends out at an angle A1 relative to the axis of extension of handle 364 with an angle range of 30 to 60° being illustrative for a handle having the above noted bend of about 45°.

FIGS. 47 to 50 show a similar arrangement as that of the corresponding views of FIGS. 43 to 47 but with an alternate handle section arrangement featuring toggle mechanism 476 supported by bent or curved handle and handle shaft combination 464, with the toggle mechanism including first lever part 478 and an intermediate bend section represented by sub-sections 481 and 482 which provide for a bend angle of A3 (preferably along the above noted horizontal plane although alternate embodiments include handles also having angles above or below such a horizontal plane). Bend angle A3 for this embodiment is shown as about 90°+/−10°. As with the above embodiment, the handle shaft extension 349 (FIG. 34A) and 449 (FIG. 47A) is shown as having a bend extending generally the same or in common with the bend of the bent portion of the toggle mechanism shown there below in each of the noted figures.

As a further example not intended to be limiting provided below are some adjustment settings relative to a five pin aperture support plate such as 66'. That is, some illustrative distances between the top of the cooking surface (e.g., the top surface of a grate (not shown) similar in design to grate 46 and positioned on flanges 60, 62) and the top of the fuel component support grate 46 itself:

Position 1: 12 cm or 4.7 inches (") (lowest setting of rods 12A and 12B/highest setting of shaft 74 (shown essentially horizontal))
Position 2: 95 cm or 3.7"
Position 3: 74 cm or 2.9"
Position 4: 57 cm or 2.2"
Position 5: 44 cm or 1.7"

The angular position of the rotary lifting arm (inside grill):
Position 1: 10° (angle AN—FIG. 36)
Position 2: 24°
Position 3: 38°
Position 4: 52°
Position 5: 74°

Figure 51:
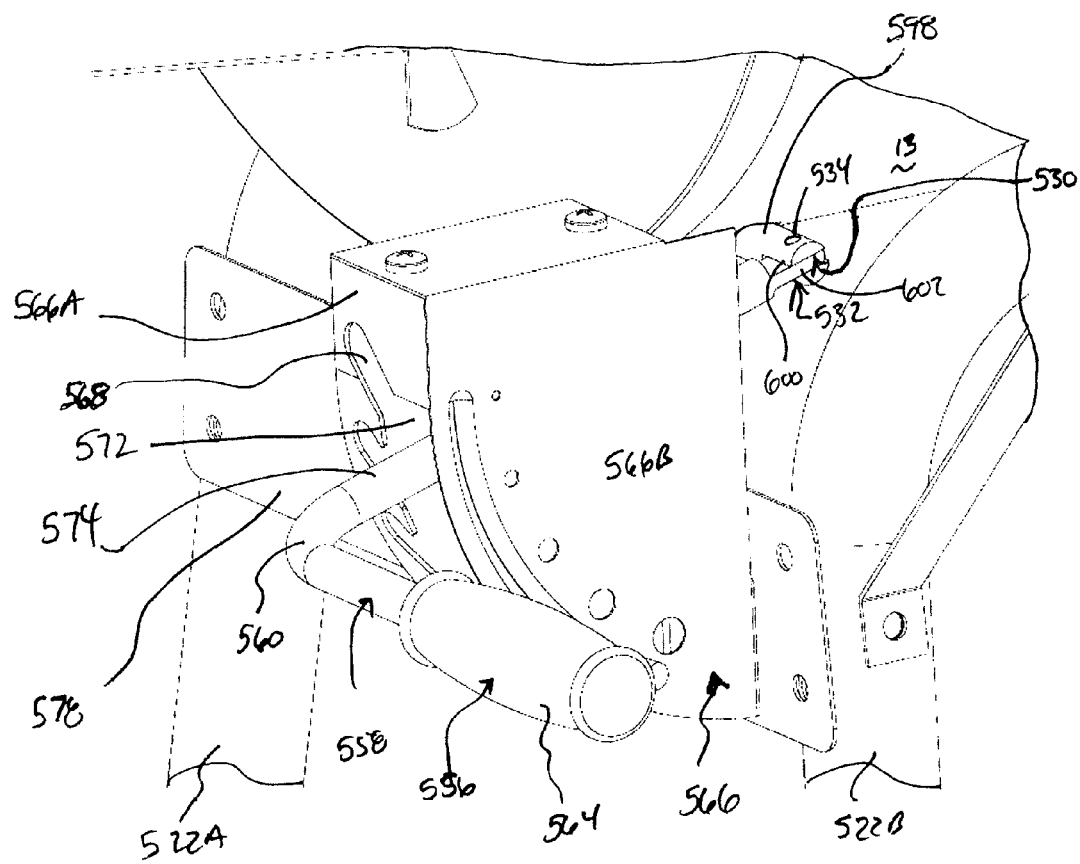
FIG. 51 shows a cut-away, perspective view of the handle section of an alternative embodiment adjustment mechanism with modified releasable engagement and adjustment means.
Figure 52:
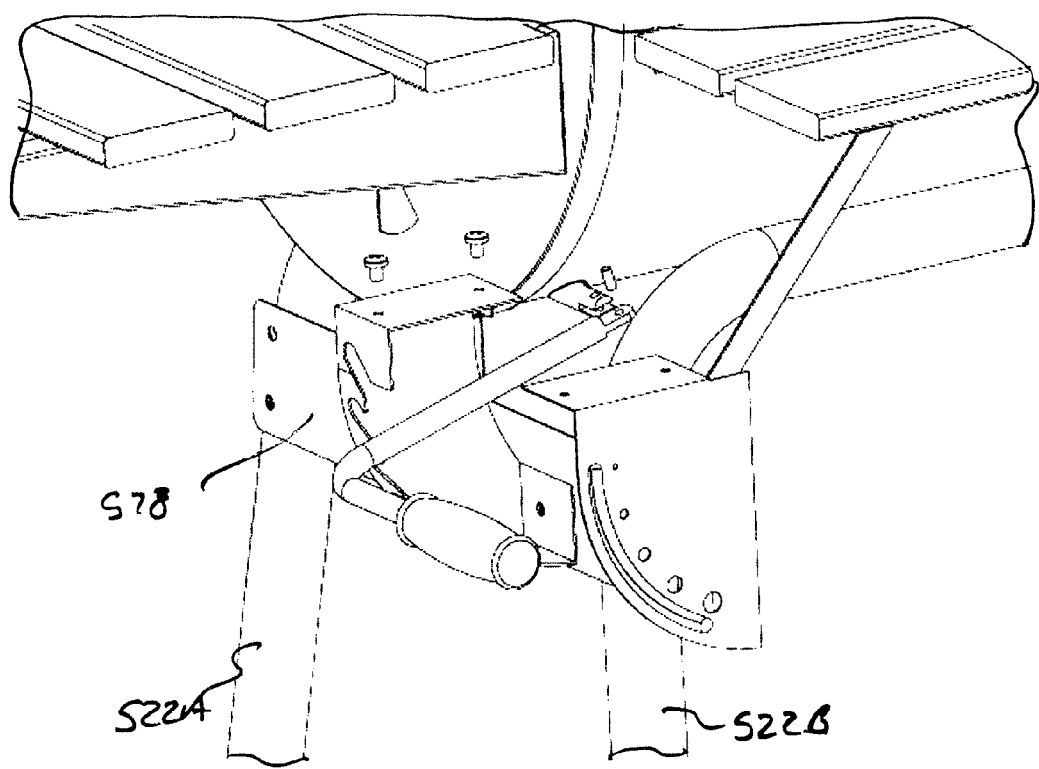
FIG. 52 shows a partially exploded view of the handle section featured in FIG. 51.
Figure 53:
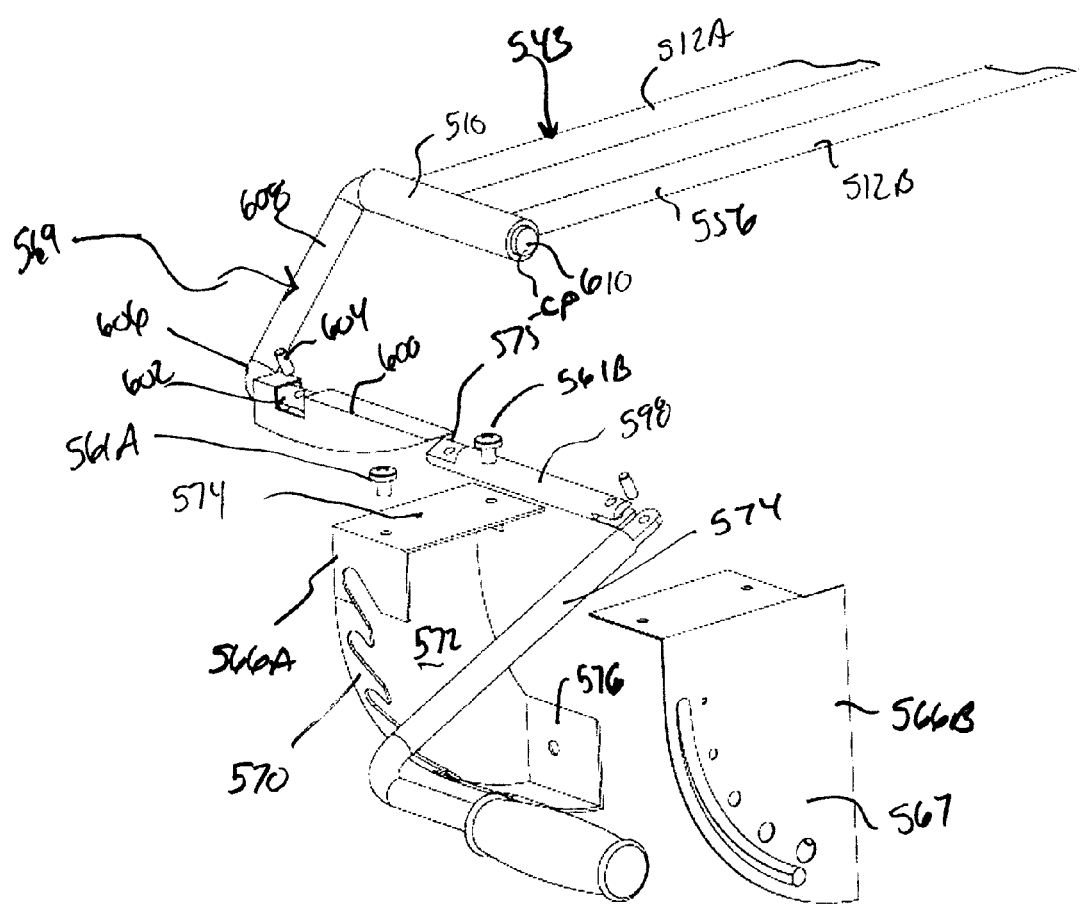
FIG. 53 shows a more fully exploded view of the handle section featured in FIG. 51.

FIGS. 51-53 provide an illustration of an additional embodiment of a cooking apparatus of the present invention which can have common features as in the above-described embodiments but which includes a modified adjustment mechanism 556 comprising handle section 558 with handle 564 and handle shaft section 574 which is shown in this embodiment with a horizontal outward bend section 560 (shown as having a 90° bend as in the FIG. 49 embodiment). Rather than the hand grasp spring based toggle based setting means 130 of the FIG. 49 embodiment, however, the releasable engagement and repositioning or setting means 530 comprises a lateral pivot engagement assembly 532 which includes a pivot pin 534 connection with an end of shaft section 598. In the embodiment shown, there is a male/female pivot connection provided by a notch/projection combination shown in this embodiment as comprising a notch or reception aperture 600 in the exposed end of shaft section 598 and a tapered or step-down projection 602 received in notch 600. The orientation of the notch end pivot pin 534 provides for a lateral swing out (e.g., a horizontal notch and vertical pivot pin orientation when the handle is in an upper position).

Lateral pivot engagement assembly 532 provides for lateral swinging out while still providing for a vertical swing adjustment in handle shaft section 574 (and a corresponding, opposite height adjustment in the fuel component support device). Handle shaft section 574 is further shown as being associated with handle position retention section 566 which in this embodiment features handle location fixation slots 568 (as in 5 such slots which are shown as slots extending obliquely upward from an initial access opening portion). The slots 568 are shown as being provided in arc shaped outer plate section 570 which has an additional swing guide opening 572 which opens into the respective slots' initial access opening portions. Handle position retention section is shown as comprising first and second guide housing components 566A and 566B which, as shown in FIGS. 52 and 53 features first the aforementioned outer plate 570 having section 566A as including, as well as lateral inward housing plate section 572, upper plate section 574 and lower plate section 576. Lower plate section 576 is shown as having a securement means for securement to a support base component represented by base component 578 shown as a securement plate secure at its opposite ends to legs 522A and 522B of the cooking apparatus support base.

There is further shown in FIGS. 51-53 that handle position retention section 566 has second housing component 566B as having outer (user facing) face plate section 567 and upper plate section 569 which is designed for overlapping with upper plate section 574 of first housing component 566A to provide for securement of the first and second housing sections 566A and 566B together via one or more fasteners such as fasteners 561A and 561B. There is further provided vertical swing guidance for handle section 574 as well as outward lateral rotation limiting means as handle section 574 is limited in rotation by plates 572 and 567 of the housing 566.

Also, as seen, slots 568 with their vertical upward and oblique orientation provide for automatic location fixation in that the linkage assembly 598 located downstream of shaft section 598 has a gravity based weight tending to lift up the handle shaft section 574 about the pivot location represented by shaft section 598 deep into a respective slot.

As also shown in FIG. 53 first shaft section 598 is a non-integrated or individual shaft component having the aforementioned notch connection with handle shaft section at one end (the front end in this embodiment) and a second end also having a male/female connection 575 featuring a similar notch/projection connection as the opposite end but with a preferred reversal (e.g., the shaft section having a notch at the front end and the tapered insertion projection at the opposite, rearward positioned end).

As further shown in FIG. 53 first position retention device 600 receives shaft section 598 and also includes a pivot pin reception aperture 602 which receives second pivot pin 604 that provides for connection with second bend section 606 of first interconnected shaft combination 569 shown as including first shaft section 598, bend section 606 and interconnection section 608 as well as second shaft section 610 with capped end CP to retain the reception relationship with floating sleeve 510 forming part of longitudinal extension device 543 shown as further including longitudinally extending links 512A and 512B. Although not shown, as in the previous embodiments there is provided a secure flotation sleeve at the opposite ends of links 512A and 512B which, in turn, can be drivingly connected with a second interconnected shaft combination comprising the aforementioned first and second shaft portions, an interconnected portion joining the two and with the second shaft portion received in a second position retention device as in a sleeve fixed to base shell component 13.

Thus, in operation when a user desires to change in position the fuel component support device, the user shifts down on lever 564 until the handle section 574 travels from a respective one of slots 568 to vertical guide slot 572.

The lateral rotation connection 530 between handle shaft section 574 and first shaft section 598 provides for the handle shaft section to travel laterally within the respective slot 568 while the rotation capability of the shaft section provides for the required vertical component clearance in slot 568. Once clear, the pivot relationship provided, at the lateral pivot engagement assembly allows for a vertical adjustment of handle shaft section 574 within guide slot 572. This triggers the aforementioned first interconnected shaft combination, longitudinal extension device 543, second interconnected shaft combination (see 545 in FIG. 13) to adjust in position with an upward adjustment in the fuel component support device which is generated by a vertical swinging down of handle 564 and a lowering of the fuel component support device generated with a vertical upward swing in the handle 564.

When a desired readjustment position is obtained in the fuel component support device, the handle shaft section is inserted into the closest height positioned slot opening by a lateral adjustment in the handle section whereupon a release of the handle leads to an automated rise in the shaft section 574 within the associated slot due to the counter-balancing weight of the link assembly and supported fuel component device about the pivot axis represented by pivoting first shaft section 598 in position retention device 600. Also, in plate 567 there is seen position location visual facilitation means as in the illustrated arc shaped slot and associated series of holes. When the handle is in a final resting location, its location is apparent in front view to the user due to the handle shaft section being aligned with one of the holes and extending across the arc slot.

The foregoing detailed description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

What is claimed is:

1. A fuel support adjusting device for use with a cooking apparatus, comprising:
   an adjustment mechanism drivingly connected with a fuel support receivable in a cooking container,
   said adjustment mechanism including a handle section and an interconnected shaft assembly connected with said handle section including a first interconnected shaft combination comprising a first shaft section, a second shaft section extending generally in a common direction of extension as said first shaft section and an interconnecting section connecting said first and second shaft sections,
   said interconnected shaft assembly further comprising a first joining section extending between said handle section and first shaft section, a second joining section extending between said first shaft section and said interconnecting section, and a third joining section extending between said interconnecting section and said second shaft section, and
   said first, second and third joining sections arranged such that a vertical height adjustment of said handle generates a rotation of said first shaft section relative to said first position retention device and a swinging motion in said interconnecting section and a height and longitudinal adjustment in said second shaft section, and
   a first position retention device in position retention engagement with said first shaft section such that an adjustment in height position of said handle section generates a rotation of said first shaft section relative to said first position retention device and a change in height in said second shaft section which is in height position changing engagement with said fuel support, and
   said interconnected shaft assembly arranged such that a height change of said handle section will be opposite in direction as a height change in said connected fuel support.

2. The fuel support adjusting device as recited in claim 1 wherein
   the fuel support adjusting device is configured for use with a cooking container having a longitudinal extension of a greater longitudinal length than a longitudinal extension of a fuel support receivable in said cooking container to provide longitudinal adjustment clearance between ends of said fuel support and respective adjacent interior surface portions of said cooking container as said fuel support changes in height and longitudinal position concomitantly with the change in height of said second shaft section.

3. The fuel support adjusting device as recited in claim 1 wherein
   the fuel support adjusting device further comprises a fuel support, in the form of a support rack for supporting a plurality of individual heating elements.

4. The fuel support adjusting device of claim 1 further comprising a housing which receives said handle section and comprises variable handle height position stop engagement locations.

5. The fuel support adjusting device of claim 4 wherein
   said handle section includes releasable engagement and repositioning setting means for releasable engagement and adjustment to a new location which, when the fuel support adjusting device is connected to a fuel support, correlates with a change in height in said connected fuel component support device.

6. The fuel support adjusting device of claim 5 wherein
   said releasable engagement and reposition setting means includes a lateral pivot engagement with said first shaft section as to provide for operation of said releasable engagement and position setting means to provide for a release and reengagement of said handle section relative to said housing.

7. A fuel support adjusting device for use with a cooking apparatus, comprising:
   an adjustment mechanism configured to be drivingly connected with a fuel support receivable in a cooking container,
   said adjustment mechanism including a handle section and an interconnected shaft assembly connected with said handle section received in a housing which comprises variable handle height position stop engagement locations wherein, said housing has an arc shaped portion with the stop engagement locations arranged along said arc,
   said handle section including releasable engagement and repositioning setting means for releasable engagement and adjustment to a new location which, when the fuel support adjusting device is connected to a fuel support, correlates with a change in height in said connected fuel support, said releasable engagement and reposition setting means includes a lateral pivot engagement with said first shaft section as to provide for operation of said releasable engagement and position setting means to provide for a release and reengagement of said handle section relative to said housing and
   said lateral pivot engagement is arranged such that said handle section is pivoted generally along a horizontal plane before being swung generally along a vertical plane to a different handle height position stop engagement location;
   said interconnected shaft assembly including,
      a first interconnected shaft combination comprising a first shaft section, a second shaft section positioned as to extend generally in a common direction of extension as said first shaft section and an interconnecting section connecting said first and second shaft sections, and
      a first position retention device which is in position retention engagement with said first shaft section such that an adjustment in height position of said handle section generates a rotation of said first shaft section relative to said first position retention device and a change in height in said second shaft section which is configured to be placed in height position changing engagement with a fuel support, and
   said interconnected shaft assembly being arranged such that a height change in a handle of said handle section will be opposite in direction as a height change in a connected fuel support.

8. A fuel support adjusting device for use with a cooking apparatus, comprising:
   an adjustment mechanism drivingly connected with a fuel support receivable in a cooking container,
   said adjustment mechanism including a handle section and an interconnected shaft assembly connected with said handle section,
   said interconnected shaft assembly including,
   a first interconnected shaft combination comprising a first shaft section, a second shaft section extending generally in a common direction of extension as said first shaft section and an interconnecting section connecting said first and second shaft sections, an extension device in driving engagement with said first shaft section and is configured, when connected to a fuel support, to extend in a common direction of extension as the connected fuel component support device; wherein said extension device includes a first reception sleeve that receives in rotating fashion said second shaft section, a second interconnected shaft combination comprising a first shaft portion, a second shaft portion positioned as to extend generally in a common direction of extension as said first shaft portion and an interconnecting portion connecting said first and second shaft portions, and a second position retention device which is in position retention engagement with the second shaft portion such that an adjustment in position of said handle generates a rotation of said first shaft section relative to said first position retention device and a change in height and longitudinal position in said second shaft section which, in turn, leads to a change in height and longitudinal position in said extension section, which, in turn, leads to a change in height and longitudinal position of said first shaft portion causing a swinging of said interconnecting portion and a rotation of said second shaft portion relative to said second position retention device;

a second reception sleeve that receives in rotating fashion said first shaft portion, and wherein said extension device includes at least one longitudinal link drivingly interconnecting said first and second reception sleeves and a first position retention device in position retention engagement with said first shaft section such that an adjustment in height position of said handle section generates a rotation of said first shaft section relative to said first position retention device and a change in height in said second shaft section which is in height position changing engagement with said fuel support, and said interconnected shaft assembly being arranged such that a height change in a handle of said handle section will be opposite in direction as a height change in said fuel support.

9. The fuel support adjusting device of claim 8 wherein said extension device includes a pair of laterally spaced longitudinal links which are configured, when connected to a fuel component support device, to extend for at least 30% of the longitudinal length of said fuel support.

10. The fuel support adjusting device of claim 8 wherein the fuel support adjusting device is configured for use with a fuel component support device comprising a capture tray having an undersurface configured to be supported by said extension device, and said tray and first and second sleeves are configured, when the fuel support adjusting device is connected to such a fuel component support device, to be in engagement such that longitudinal motion in said first and second sleeves is imparted to said capture tray free of longitudinal slippage.

11. The fuel support adjusting device of claim 10 wherein said tray and sleeves define male/female abutment combinations that, when the fuel support adjusting device is connected to such a fuel support, avoid longitudinal slippage in either direction of longitudinal adjustment of said connected fuel support.

12. A fuel support adjusting device for use with a cooking apparatus, comprising:
an adjustment mechanism configured to be drivingly connected with a fuel support receivable in a cooking container, said adjustment mechanism including a handle section configured such that, when the fuel support adjusting device is connected to such a fuel support, and during swinging rotation of said handle section, a free end of said handle section adjusts in a height adjustment direction that is opposite to a height adjustment direction in said fuel support and, an interconnected shaft assembly connected with said handle section, said interconnected shaft assembly including
a first shaft section and a linkage assembly drivingly connected to said first shaft section and configured, when the fuel support adjusting device is connected to such a fuel support, to be positioned between a base portion of said cooking container and said connected fuel support such that rotation of said first shaft section produces a change in vertical height in said linkage assembly and the connected fuel support; and a handle engagement section which comprises a plurality of height position stop engagement locations, further comprising a housing supporting an arc shaped portion with the stop engagement locations comprising a plurality of slots arranged along said arc and dimensioned to receive therein a portion of said handle section, wherein said housing is configured to be connected to a support base of a cooking container, said handle section being releasably engageable with said engagement locations as to be configured, when the fuel support adjusting device is connected to such a fuel support, for releasably fixing the connected fuel support at one of a plurality of different height positions following a swinging rotation in said handle section.

13. The fuel support adjusting device of claim 12 wherein said adjustment mechanism further includes a lateral pivot engagement between said handle section and said first shaft section as to provide for a generally horizontal swinging in said handle section as to provide for a release and reengagement of said handle section relative to said engagement locations.

14. The fuel support adjusting device as recited in claim 12 wherein said driving connection between said adjustment mechanism and said fuel support is a mechanically-joined connection.

* * * * *